US006426959B1

United States Patent
Jacobson et al.

(10) Patent No.: US 6,426,959 B1
(45) Date of Patent: Jul. 30, 2002

(54) SYSTEM AND METHOD FOR FACILITATING COMPONENT MANAGEMENT IN A MULTIPLE VENDOR SATELLITE COMMUNICATIONS NETWORK

(75) Inventors: Jeffrey R. Jacobson, Bethesda, MD (US); Ronald Nau, Sterling, VA (US); Scott Swanson, Columbia, MD (US); Moe G. Abutaleb, Potomac, MD (US); David J. Megel, Gaithersburg, MD (US); James C. Crichton, Rockville, MD (US)

(73) Assignee: Innovative Communications Technologies, Inc., Gaithersburg, MD (US)

( * ) Notice: Subject to any disclaimer, the term of this patent is extended or adjusted under 35 U.S.C. 154(b) by 0 days.

(21) Appl. No.: 09/252,087

(22) Filed: Feb. 18, 1999

Related U.S. Application Data

(63) Continuation of application No. 09/235,490, filed on Jan. 22, 1999.
(60) Provisional application No. 60/072,852, filed on Jan. 20, 1998, and provisional application No. 60/075,101, filed on Feb. 18, 1998.

(51) Int. Cl.[7] .......................... H04J 3/24; H04B 7/208
(52) U.S. Cl. .................. 370/468; 370/316; 370/329
(58) Field of Search ................. 370/310, 315, 370/316, 320, 321, 322, 324, 327, 328, 329, 465, 466, 468; 709/223, 226, 229, 310; 455/7, 9

(56) References Cited

U.S. PATENT DOCUMENTS

| 3,610,828 A | 10/1971 | Girard et al. |
| 3,651,404 A | 3/1972 | Rollins |
| 3,688,197 A | 8/1972 | Kahn |

(List continued on next page.)

OTHER PUBLICATIONS

GTE Government Systems, STU–III Telephone Line Termination Unit (STLTU), "Command, Control and Communications Systems", 3 pages.

Stanford Telecom, STEL 9610 and 9620 Digital Link Interface Units, 49 pages.

Racal Avionics, MCS–3000/6000 SATCOM System, 20 pages.

(List continued on next page.)

*Primary Examiner*—Ricky Ngo
(74) *Attorney, Agent, or Firm*—Hunton & Williams

(57) ABSTRACT

A system is provided for controlling a network of communication terminals with a a management component and an implementation component, the implementation component in communication with the management component to receive at least one transmission plan, the transmission plan containing a scheduled implementation time, the implementation component receiving-the transmission plan, decoding an implementation time for the transmission plan and outputting command to network component at the implementation time to implement the transmission plan.

41 Claims, 23 Drawing Sheets

U.S. PATENT DOCUMENTS

| | | | |
|---|---|---|---|
| 3,885,216 A | | 5/1975 | Kahn |
| 4,188,580 A | | 2/1980 | Nicolai et al. |
| 4,227,255 A | | 10/1980 | Carrick et al. |
| 4,355,401 A | | 10/1982 | Ikoma et al. |
| 4,368,357 A | | 1/1983 | Gurak |
| 4,411,017 A | | 10/1983 | Talbol |
| 4,555,805 A | | 11/1985 | Talbol |
| 4,597,107 A | | 6/1986 | Ready et al. |
| 4,625,303 A | * | 11/1986 | Kim et al. .................. 370/468 |
| 4,642,424 A | | 2/1987 | McNair |
| 4,680,797 A | | 7/1987 | Benke |
| 4,700,374 A | | 10/1987 | Bini |
| 4,805,208 A | | 2/1989 | Schwartz |
| 4,815,128 A | | 3/1989 | Malek |
| 4,833,696 A | | 5/1989 | Ichiyoshi |
| 4,878,228 A | | 10/1989 | Takahashi |
| 4,882,751 A | | 11/1989 | Kotzin et al. |
| 4,885,586 A | | 12/1989 | Hoover et al. |
| 4,893,339 A | | 1/1990 | Bright et al. |
| 4,914,696 A | | 4/1990 | Dudczak et al. |
| 4,920,565 A | | 4/1990 | Strawczynski et al. |
| 4,920,567 A | | 4/1990 | Malek |
| 4,931,250 A | | 6/1990 | Greszczuk |
| 4,985,918 A | | 1/1991 | Naruse et al. |
| 4,989,232 A | | 1/1991 | Tsumura |
| 5,117,453 A | | 5/1992 | Plasecki et al. |
| 5,166,977 A | | 11/1992 | Ross |
| 5,186,797 A | | 2/1993 | Barrett et al. |
| 5,243,653 A | | 9/1993 | Malek et al. |
| 5,253,293 A | | 10/1993 | Shigemitsu et al. |
| 5,347,542 A | | 9/1994 | Kurby et al. |
| 5,351,240 A | | 9/1994 | Highsmith |
| 5,361,302 A | | 11/1994 | Malek et al. |
| 5,371,734 A | | 12/1994 | Fischer |
| 5,384,777 A | | 1/1995 | Ahmadi et al. |
| 5,392,357 A | | 2/1995 | Bulier et al. |
| 5,404,394 A | | 4/1995 | Dimolitsas et al. |
| 5,410,599 A | | 4/1995 | Crowley et al. |
| 5,442,659 A | | 8/1995 | Bauchot et al. |
| 5,488,653 A | | 1/1996 | Dimolitsas et al. |
| 5,504,802 A | | 4/1996 | Kennedy et al. |
| 5,515,178 A | | 5/1996 | Dimolitsas et al. |
| 5,537,469 A | | 7/1996 | Beniston et al. |
| 5,592,470 A | | 1/1997 | Rudrapatna et al. |
| 5,600,797 A | | 2/1997 | Marshall |
| 5,606,560 A | | 2/1997 | Malek et al. |
| 5,623,492 A | | 4/1997 | Teraslinna |
| 5,638,363 A | | 6/1997 | Gittins et al. |
| 5,673,393 A | | 9/1997 | Marshall et al. |
| 5,697,078 A | | 12/1997 | Peterson et al. |
| 5,724,414 A | | 3/1998 | Demolitsas et al. |
| 5,812,545 A | * | 9/1998 | Liebowitz et al. .......... 370/337 |
| 5,838,668 A | * | 11/1998 | Okada et al. ................ 370/312 |
| 5,841,765 A | * | 11/1998 | Fielding et al. ............. 370/319 |
| 5,974,142 A | | 10/1999 | Heer et al. |
| 6,011,800 A | * | 1/2000 | Nadgauda et al. ........... 370/437 |
| 6,016,311 A | * | 1/2000 | Gilbert et al. ............... 370/280 |
| 6,018,311 A | | 1/2000 | Gilbert et al. |
| 6,269,078 B1 | * | 7/2001 | Lakshman et al. .......... 370/230 |

OTHER PUBLICATIONS

Ball Aerospace Technologies Corp., Secure AIRLINK Satcom, 6 pages.

Inmarsal: Facts About Inmarsal, 17 pages.

Collins AIR Transport Division SAT–906, COTS L–Band SATCOM, a smart, Reliable Satellite Communication System FOR New installations on Tankers. Transports and VIP Aircraft, 4 pages.

International Mobile Satellite Conference, "Secure Voice for Mobile Satellite Applications", A. Vaisnys et al., pp. 723–728.

AMT Experiments Home Page, "The ACTS Mobile Terminal Experiments", pp. 1–46 <http://haagar.jpl.nasa.gov/–pinck/exp–desc.html>.

Stanford Telecom, STEL–9610A –STEL–9620A: Digital Link Interface Units, 6 pages.

Data Communications, Network Analysis: "Clinton's Clipper: Can It Keep A Secret?". S. Salamone, pp. 53–54,56 and 58.

Communications of the ACM, Feb. 1978, vol. 21, No. 2, "A Method for Obtaining Digital Signatures and Public–Key Cryptosystems", R. L. Rivest et al., pp. 120–126.

Eurocrypt '91, Dec. 4, 1990, "New Approaches to the Design of Self–Synchronizing Stream Ciphers", U. Maurer, pp. 1–10.

Dow Jones & Co., (1991), Reprinted from The Wall Street Journal, "Personal–Computer Makers Join Forces in Move to Prevent Tampering, Forgery", P. Zachary, 4 pages.

SDVT Technical Description, 2 pages.

DNVT: Digital Non–secure Voice Terminal, 4 pages.

Datapro Research, Secure Speech Communications, "Evaluating Secure Speech Systems", Jan. 1987, H. Beker et al., pp. MT30–340–101 to MT30–340–116.

Datapro Research, "Making Your Communications System Secure", E. Inco, pp. MT30–500–101 to MT30–500–107.

U.S. Department of Commerce, "Key Management Using ANSI X9.17", pp. 1–28.

American National Standard, pp. 1–135.

U.S. Department of Commerce/National Bureau of Standards, "Guidelines for Implementing and Using The NBS Data Encryption Standard", pp. 1–39.

Design and Specification of Cryptographic Capabilities, C. Campbell, pp. 54–66.

Comsat and ATM: The First Provide Asynchronous Transfer Mode Over Satellite, 2 pages.

IDB Systems: Flyaway Satellite Earth Terminals. Rapid Deployment Terminals, 8 pages.

Commercial Satellite Communications Program Initiatives: Preliminary User Requirements for the Commericial–Placed Private DoD General Purpose Fixed Satellite Services Network, 81 pages.

Scientific–Atlanta wants to change your view of data communications, 7 pages.

National Security Agency, Signaling Plan –Interoperable Modes, pp. 1–1 to 1–4, 2–1 to 2–157, 3–1 to 3–12, 4–1 to 4–18, and A–1 to A–2.

National Security Agency, "Condor", pp. 1–8, <http://www.nsa.gov.8080/programs/missi/condor.html>.

IDB Systems, "Specialist In Satellite Earth Station Systems", 68 pages.

* cited by examiner

| | TIME 0 | TIME 0 + 6 HOURS | TIME 0 + 12 HOURS | TIME 0 + 18 HOURS |
|---|---|---|---|---|
| MONDAY | TRANSMISSION PLAN #1 | TRANSMISSION PLAN #2 | TRANSMISSION PLAN #3 | TRANSMISSION PLAN #4 |
| TUESDAY | TRANSMISSION PLAN #5 | TRANSMISSION PLAN #6 | TRANSMISSION PLAN #7 | TRANSMISSION PLAN #8 |
| WEDNESDAY | TRANSMISSION PLAN #9 | TRANSMISSION PLAN #10 | TRANSMISSION PLAN #11 | TRANSMISSION PLAN #12 |
| THURSDAY | TRANSMISSION PLAN #13 | TRANSMISSION PLAN #14 | TRANSMISSION PLAN #15 | TRANSMISSION PLAN #16 |
| FRIDAY | TRANSMISSION PLAN #17 | TRANSMISSION PLAN #18 | TRANSMISSION PLAN #19 | TRANSMISSION PLAN #20 |
| SATURDAY | TRANSMISSION PLAN #21 | TRANSMISSION PLAN #22 | TRANSMISSION PLAN #23 | TRANSMISSION PLAN #24 |
| SUNDAY | TRANSMISSION PLAN #25 | TRANSMISSION PLAN #26 | TRANSMISSION PLAN #27 | TRANSMISSION PLAN #28 |

FIG. 11

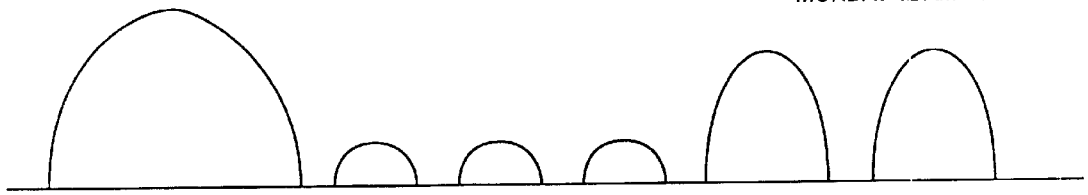
TRANSMISSION PLAN #1
MONDAY 12 AM TO 6 AM
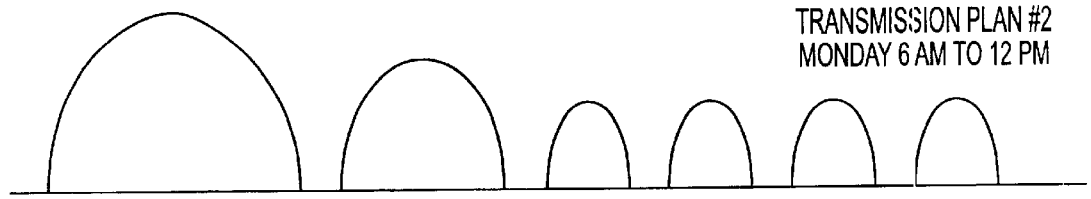
TRANSMISSION PLAN #2
MONDAY 6 AM TO 12 PM
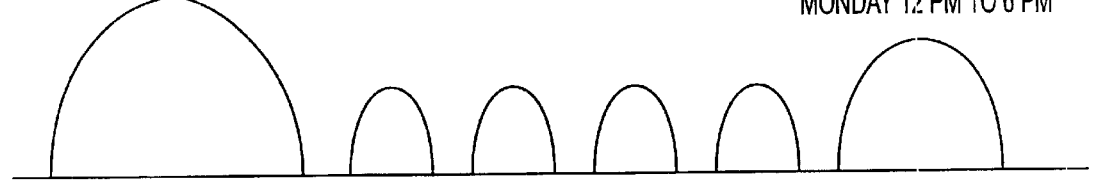
TRANSMISSION PLAN #3
MONDAY 12 PM TO 6 PM
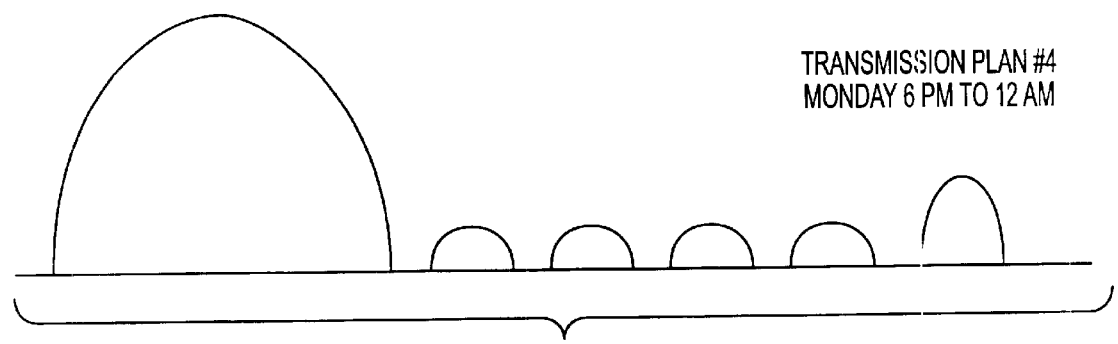
TRANSMISSION PLAN #4
MONDAY 6 PM TO 12 AM
FIG. 12

SYSTEM AND METHOD FOR FACILITATING COMPONENT MANAGEMENT IN A MULTIPLE VENDOR SATELLITE COMMUNICATIONS NETWORK

This application is a continuation of Ser. No. 09/235,490 filed Jan. 22, 1999 and claims benefit of Provisional Application Ser. No. 60/072,852 filed Jan. 20, 1998, and application Ser. No. 60/075,101 filed Feb. 18, 1998.

FIELD OF THE INVENTION

This invention relates to communication methods and apparatus for providing network management, bandwidth and path control in a heterogeneous network that may be composed of multiple vendor equipment and transmission paths. More specifically, the communication system concerns semi-autonomous implementation components within a management hierarchy to globally manage multiple vendor elements while satisfying local network demands.

BACKGROUND OF THE INVENTION

Telecommunications services have, for many years, attempted to optimize or minimize bandwidth usage between network elements. Since the modern communications era, brought about by the theories of Shannon, telecommunications engineers have been keenly aware of the need to provide optimal, or at least good solutions, to bandwidth allocation problems in point-to-point and point-to-multipoint networks.

In wireless communication systems, solutions to bandwidth allocation problems can be seen in the way data is modulated to "share" finite resources. For example, time division multiple access ("TDMA") provides a means for multiple stations to access time slots on satellite carriers and thereby "share" bandwidth resources. Code Division Multiple Access ("CDMA") provides a means to use code division modulation techniques (time and frequency modulation) for multiple point access to a predetermined range of bandwidth and thereby "share" bandwidth space. Likewise, frequency division multi-access ("FDMA") provides a means to divide up and share a finite bandwidth resource.

More elaborate schemes to dedicate bandwidth in accordance with a predetermined transmission schedule and modulation plan can be seen in U.S. Pat. No. 5,592,470 to Rudrapatna et al., ("Rudrapatna") issued Jan. 7, 1997, (the "Rudrapatna patent"). The Rudrapatna patent concerns a terrestrial micro-port network that allocates bandwidth to terrestrial micro-port receivers based on a pre-determined schedule and modulation plan. The pre-determined schedule and plan may be subsequently modified by dynamic demands on the micro-ports. The network can then satisfy the dynamic demands by moving channels between modulation and polarity schemes in pre-determined amounts.

In wireless networks, certain communications links require more bandwidth and power resources than others. This is necessary to maintain specified information throughput, to provide appropriate grades of service or due to varying site configurations (e.g., different antenna sizes). Whenever a change in network resource allocations is required to match varying traffic requirements, a new transmission plan may or may not be implemented. This may necessitate programming, transmitting and receiving communications equipment, e.g., amplifiers, modulators and demodulators, to support the new resource assignments. These and other problems in bandwidth allocation in a multi-vendor network are addressed by the present invention.

SUMMARY OF THE INVENTION

The methods and apparatus disclosed herein may assign and re-assign available transmission resources in point-to-point, multipoint and broadcast wireless networks. This may be accomplished on the basis of information capacity and connectivity requirements between transmitters and receivers of communications links at the time of assignment or reassignment. The system may also provide a network administrator with novel tools and automated methods to define and implement network transmission plans and to modify allocation decisions as traffic requirements change.

The system may provide the tools to efficiently allocate transmission resources. These tools help implement the communications links that form wireless networks. An optimum resource or a "good fit" allocation is achieved when network users have just enough information transmission capacity to perform their tasks. One way to accomplish optimal or good transmission resource allocations in a wireless network is to analyze network users' usage patterns and allocate capacity according to a time-varying schedule.

By analyzing network usage patterns, a management component can determine a transmission plan schedule that efficiently allocates the satellite bandwidth available to the network based on historical usage patterns. The management component may automatically schedule and implement a transmission plan. As the network users' requirements change, the management component may update or modify the scheduled transmission plans to satisfy the new requirements.

The system may automate implementation of transmission plans by reprogramming the system when predetermined parameters are reached. For example, the management component may determine a transmission plan from a historical analysis of bandwidth requirements between stations. This transmission plan may be automatically deployed to the network. The management component can then monitor and analyze network allocation demands to determine a new transmission plan. The new transmission plan can then be automatically deployed in the network when predetermined parameters are reached, such as, average change in bandwidth, e.g., bandwidth in use/bandwidth in the transmission plan, exceeds a predetermined amount or if a predetermined amount of time has transpired. The transmission plans may be propagated as generic network commands and translated into corresponding equipment parameters and associated control commands as required for reconfiguring network equipment elements. Thus, the system may generate and distribute equipment configurations to network elements to reprogram for synchronized execution at predetermined times.

The system further controls and schedules bandwidth between network elements to consider other network factors such as economic constraints. In a wireless communications network, each communications carrier should have just enough bandwidth and power necessary to meet the needs of its corresponding users. Although optimum resource allocation is the primary goal, sub-optimum allocation may be tolerated when economic constraints may limit transmission resources to finite amounts. Thus, for example, a dynamic bandwidth requirement at a network station may require an increase in bandwidth allocation from the station, such as when the queuing depth reaches a predetermined amount at the station switch. The station may have additional capacity available on an available communication link, however, the incremental capacity of the link may far exceed the bandwidth required to reduce the depth of the communication queue. Furthermore, the financial cost of the incremental capacity may exceed the cost of waiting for network usage to decrease to reduce the depth of the queue. The system, in this case, would allow the network to back up and flow control the user data before the system would allocate additional capacity. The system provides methods to use finite transmission resources by enabling power and bandwidth to be re-allocated as needed to meet changing communications requirements in satellite networks. However, the capabilities of the system are applicable to all wireless networks that can be modeled as a collection of transmitters, transmission resources, and receivers.

The system provides a means to manage heterogeneous or multiple vendor network equipment over heterogeneous or multiple vendor transmission resources with multiple transmission paths. One such path may be via programmable C-, Ku-, or Ka-band satellite networks. Other paths may be via discrete carriers available on a preprogrammed networks such as the Inmarsat, Globalstar or Iridium satellite systems. Yet other paths may be via third party medium or broadband networks such as the envisioned Teledesic satellite network. Yet another path may be over a programmable or managed network such as the Intelsat global satellite system. Thus, the system provides a means to define and manage capacity between network elements where the network may be a combination of a discrete bandwidth allocation network managed by an external system, a semi-programmable medium or broadband network wherein a varying amount of bandwidth may be allocated from an externally managed resource and a fully-programmable network where the resource is managed by a network management component. Thus, the management system provides a nearly transparent means by which an operator, user or network element may place demands on the network and the management system may satisfy those demands based on a least cost algorithm, quality of service parameters and pre-defined or time-varying transmission plans.

The management system described may configure the transmission elements (transmitters and receivers) in a wireless network to implement a specified allocation of transmission resources according to varying, scheduled or ad-hoc capacity requirements. The system maintains a schedule of transmission plan implementations and may automatically perform each implementation at a scheduled time.

The semi-autonomous network management system essentially consists of two semiautonomous components. The first component is the Implementation Component (IC) which executes at a site containing network transmission elements and the second is a Management Component (MC) which executes at a network management site. These components may be connected via a user datagram Internet protocol messaging format.

At the heart of the system is the IC. The IC may be a stand-alone application program that controls one or more network elements. A network element may be the station or communication equipment physically controlled by an IC. Thus, it is usually the case that the network element is a stationary or mobile communications node at a single physical location. The IC may, however, remotely control a network element.

In one embodiment of the present invention, the IC application may execute in a dedicated processing environment such as a PC executing UNIX or other suitable operating system such as Windows or DOS. The IC may also execute on an integrated or embedded processor such as a PC on a card environment with an application specific or real time operating system executing thereon.

The IC is semi-autonomous, e.g., it can translate allocation commands from a management component into executable commands for its associated network elements without having direct, full-time contact with the network management component. The IC may store pre-programmed parameters, transmission plans, or collection commands for automatic execution. The IC may map a network programming language command set or generic allocation command to a vendor specific command sequence. The IC may contact the management component to receive permission to access network bandwidth, to report the unavailability of network elements, or to request different allocation parameters if or when local demands exceed the IC's preprogrammed allocations. Thus, the IC may provide independent control over network elements while maintaining or executing a management plan.

In the semi-autonomous network management scheme disclosed, transmission schedules may be loaded in advance of the implementation of the scheduled transmission plans. Then, at a predetermined time, the network can switch over to the new transmission plan to implement the optimal, or at least good solution, before more complicated dynamic bandwidth allocation algorithms would need to be employed.

In addition to automatically implementing scheduled transmission plans generated by the management component, the system may also perform network usage analysis. Automated network usage analysis may require that the management component have access to traffic data collected for the network. The data may be collected automatically or manually by the management component or the implementation component may interact with the elements in the network to collect the usage data. The management component may use statistical methods to analyze the gathered network usage data to suggest or implement optimize transmission plans for efficient use of the available resources according to a schedule.

Efficient use of bandwidth spectrum may be achieved on various levels in the system. On a first level, bandwidth may be scheduled in accordance with a historical analysis of demands on the network. For example, it may be determined that Monday morning traffic is mostly outbound (i.e., from a central earth station to a mobile station). On Fridays, however, most of the traffic is in the opposite direction (i.e., from mobile stations back to the central earth station). In this instance, an assymetric channel may be opened for Monday traffic to provide higher outbound data and a slower speed return path. Then the opposite allocation may be established for Friday's traffic (e.g., a high speed channel from a mobile station to the central station and a low speed acknowledgment channel from the central station back to the mobile station). This may provide an optimal, or at least a cost-effective solution for the capacity requirements at a particular time.

On a second level, the system may allocate capacity based on class of service parameters available, for example, through an Asynchronous Transfer Mode ("ATM") type packet format. For example, a class of service may identify data packets with low priority for a particular application. In such a case, an expensive satellite carrier may not be necessary and a lower-cost transmission resource may be put online by the network to pass the required data packets. Thus, the present network can mix class of service bandwidth allocation methods with least cost routing decisions based on predetermined parameters programmed in the IC.

The semi-autonomous nature of the network management components may use a datagram protocol for interprocess communication. More specifically, the network components may communicate through the use of the User Datagram Protocol ("UDP") over an internet protocol ("IP"). Communication between the management component and the IC may use a polled or interrupt methodology.

In a polled mode, the management component contacts each of the ICs to pass UDP/IP messages or to receive Transmission Control Protocol/Internet Protocol ("TCP/IP") information from the particular IC. In an interrupt driven mode, the IC may attempt to communicate with the management component. The interrupt mode may be used to reestablish contact with the MC if the IC loses synchronization with the network or to pass alarm or other local conditions happening at the IC that may not be detected by the management component. In the interrupt driven mode, the IC may have a preassigned backup channel or predetermined bandwidth allocation to communicate with the management component. The management component may be programmed to look for alarm conditions or communication attempts from the ICs when predetermined parameter thresholds are reached.

Additionally, a signaling control mechanism between the management component and the ICs is disclosed. The signaling control mechanize operates to ensure that each of the ICs receives the appropriate message(s) and that the transmission plan may be implemented according to the predetermined schedule.

The signaling control mechanism between management component and implementation components may communicate by exchanging the following UDP/IP messages.

Transmission Control Order

Abort Order

Acknowledgment of a Transmission Control or Abort Order

Audit Request

Audit Response

A transmission control order ("TCO") specifies new transmission parameters for a transmitter or receiver. The TCO may also specify the implementation time. The implementation time may be the time at which elements should begin using the transmission parameters specified in the order. TCOs are generated by the system to implement a new transmission plan. The system sends TCOs to the ICs of transmitters and receivers that must change parameters to implement the new transmission plan. TCOs may be stored on a hard drive or other non-volatile storage so that they are preserved through IC restarts and at IC power failures.

It is possible that an IC may be down or may not be able to communicate with the managed equipment at the execution time of a TCO. When this happens, the IC may implement the current transmission plan or may implement a default state when the IC reestablishes communication with the managed equipment.

The IC may send an acknowledgment of a TCO when a TCO is received from the system. If any of the requested parameter changes cannot be implemented because the managed equipment or the configuration files do not support it, the IC notifies the management component of this in the acknowledgment.

The IC may also check that the parameter values are valid for the managed network equipment. Parameter ranges are specified in the Equipment Controller configuration files in the IC, discussed further below.

A confirmation message may not be necessary for reporting the successful implementation of a transmission control order. Because the majority of satellite networks implement single links to each remote site, if an IC is not able to implement a TCO, the IP connection to the system may be lost. The system management component may detect the problem from the lack of audit responses. If the system does not receive an audit response from an IC, the system may update the site status and alerts the management component alarm.

An abort order may instruct the IC to cancel any pending TCO for the specified transmitter or receiver. The system may send abort orders when a pending implementation is canceled by the Administrator. The IC may send an acknowledgment when it receives an abort order. The IC may send an acknowledgment when it receives a TCO or abort order from the management component.

An audit request may be periodically sent to an IC by the management component. The management component may send an audit request to check the status of a transmitter or receiver. One audit request may be sent for each transmitter and receiver being managed by an IC.

An audit response may be sent by an IC when an audit request is received from the management component. The audit response may contain the current parameter values for the transmitter or receiver specified in the audit request.

An audit response may be similar in structure to a TCO. It may include the hardware identification for a transmitter or receiver and a list of model parameters and their current values as reported by the physical hardware.

The receive frequency model parameter may be a special case: the frequency reported by the demodulator may not match the commanded receive frequency. Sources of frequency error throughout a wireless carrier transmission process may result in an offset between the expected and actual receive frequencies. Many demodulators are designed to accommodate this frequency offset by searching for the transmitted carrier in a neighborhood around the commanded receive frequency. However, the system may also account for this receive frequency offset when determining whether the physical hardware is using the same parameters as in the most recently implemented TCO.

The management component may periodically request the current parameters from all transmitters and receivers. This network auditing function may perform the following functions:

Maintains the status of communications between the management component and the transmitters and receivers in the network.

Detects parameter changes of the managed equipment.

When a difference between the specified transmission parameters for a transmitter or receiver and the managed equipment is detected, the management component may notify a Bandwidth Administrator. The management component operator interface may use an audible as well as visual alert to improve the chance that a Bandwidth Administrator will notice the difference and act to resolve it.

FIG. 21 shows equipment controller IC (150). IC (150) may have a configuration database (152) which stores a configuration mapping for end-user receiver and transmitter equipment which is interfaced by, for example, serial devices (164, 166, 172, 174) and parallel devices (188, 190). The receiver/transmitter equipment may be from multiple vendors and thus the configuration database (152) maps commands from the management component (156) to a particular device. This feature of the IC may allow the use of a generic network control language in commands sent to IC (150) (discussed further below).

The system is designed to manage all transmission equipment, regardless of manufacturer. To achieve this, the management component deals with model satellite transmitters and receivers as illustrated in FIG. 6.

The transmitter and receiver models have the parameters necessary to implement a wireless link. Only parameters that relate to the establishment of a wireless link need be included in the transmitter and receiver models.

The management component may not require information about the physical equipment elements used to implement the communications links in the managed network. Therefore, the MC need not map the model parameters directly to commands for the physical hardware of the transmitters and receivers at a site. The IC may have information about the physical hardware at its site and may map the model parameters to the appropriate commands and responses.

The IC may read information about the physical hardware from the configuration files. These files may specify the information required by the IC to monitor and control the managed equipment at a site. The IC configuration files may contain the information necessary to convert parameter changes for the model transmitters and receivers into commands to the physical hardware.

BRIEF DESCRIPTION OF THE DRAWINGS

FIG. 11 is a graphical depiction of the transmission plans of a transmission plan schedule.

FIG. 12 is a graphical depiction of a transmission plan schedule implemented throughout a particular day.

DETAILED DESCRIPTION OF PREFERRED EMBODIMENT

The system is composed of two software components, the Management Component ("MC") and the Implementation Component ("IC") that work together to monitor and control the transmission elements in a wireless network.

Figure 4:
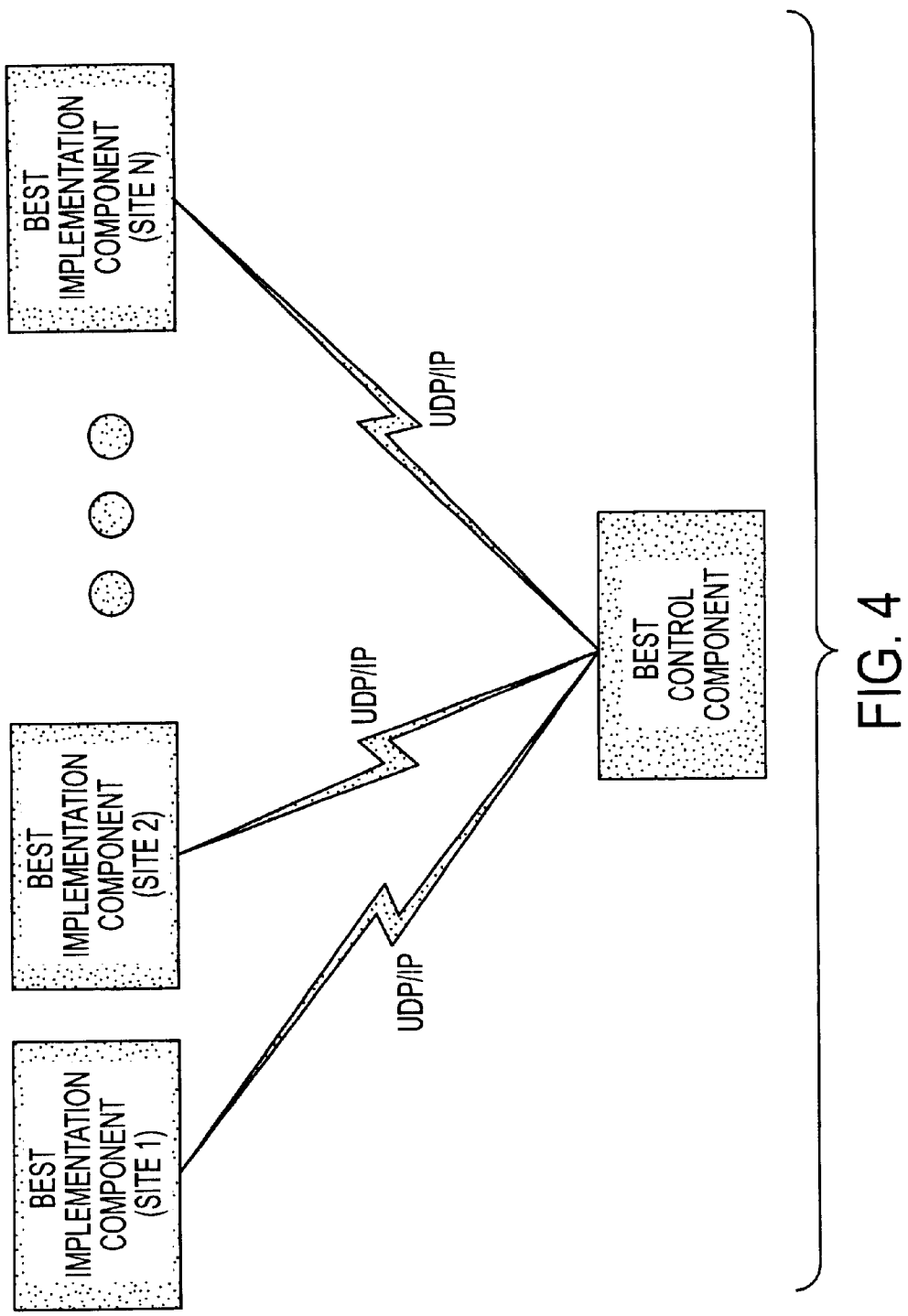
FIG. 4 depicts software components for the semi-autonomous network management system of the present invention.
Figure 5:
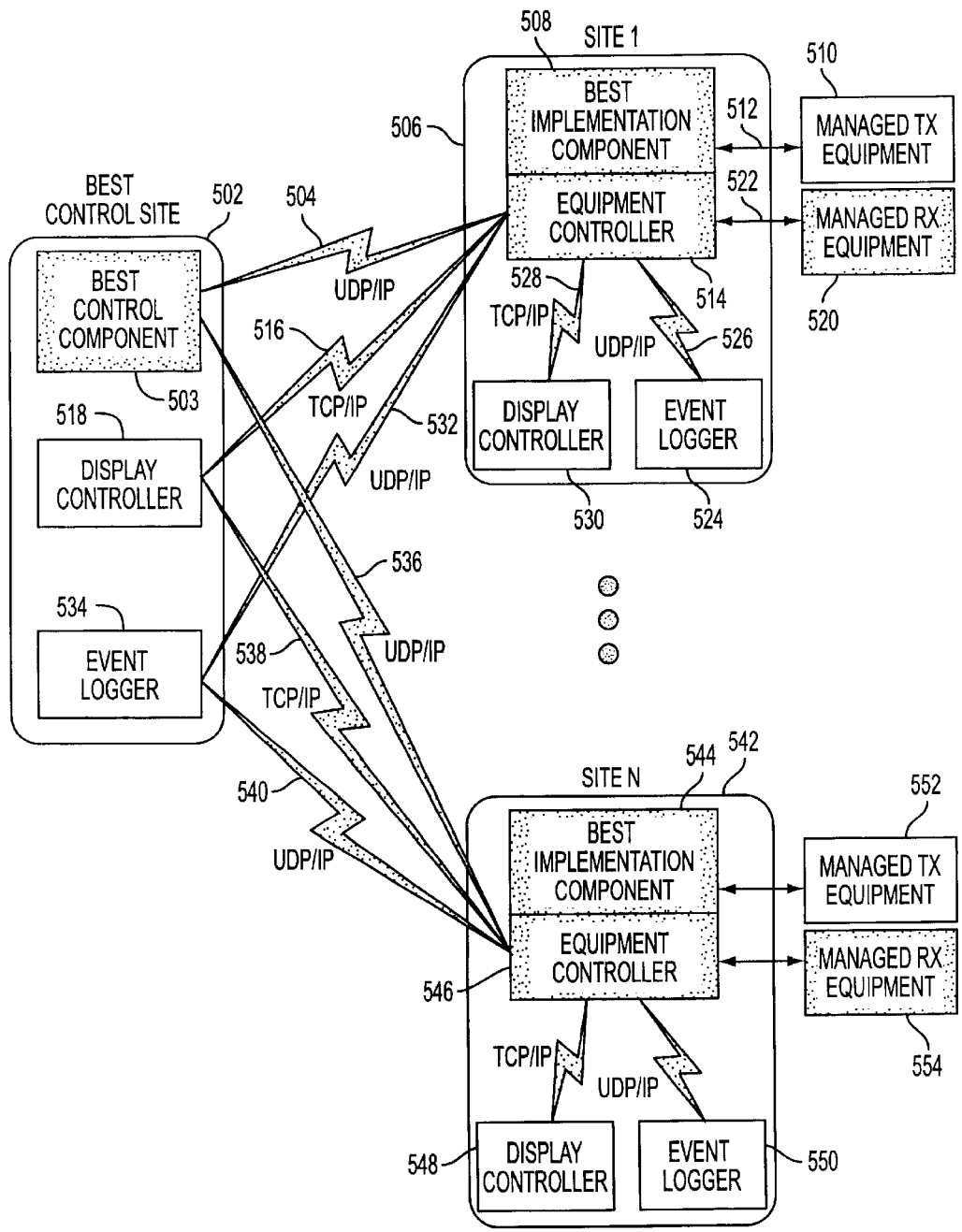
FIG. 5 is a functional schematic detailing the software components. At the control site there is a management (control) component, a display controller and an event logger component. At the remote site, there is the IC, the equipment controller component and a display controller and event logger component. The management transmission and receiver equipment is further shown as being controlled from the IC equipment control.
Figure 6:
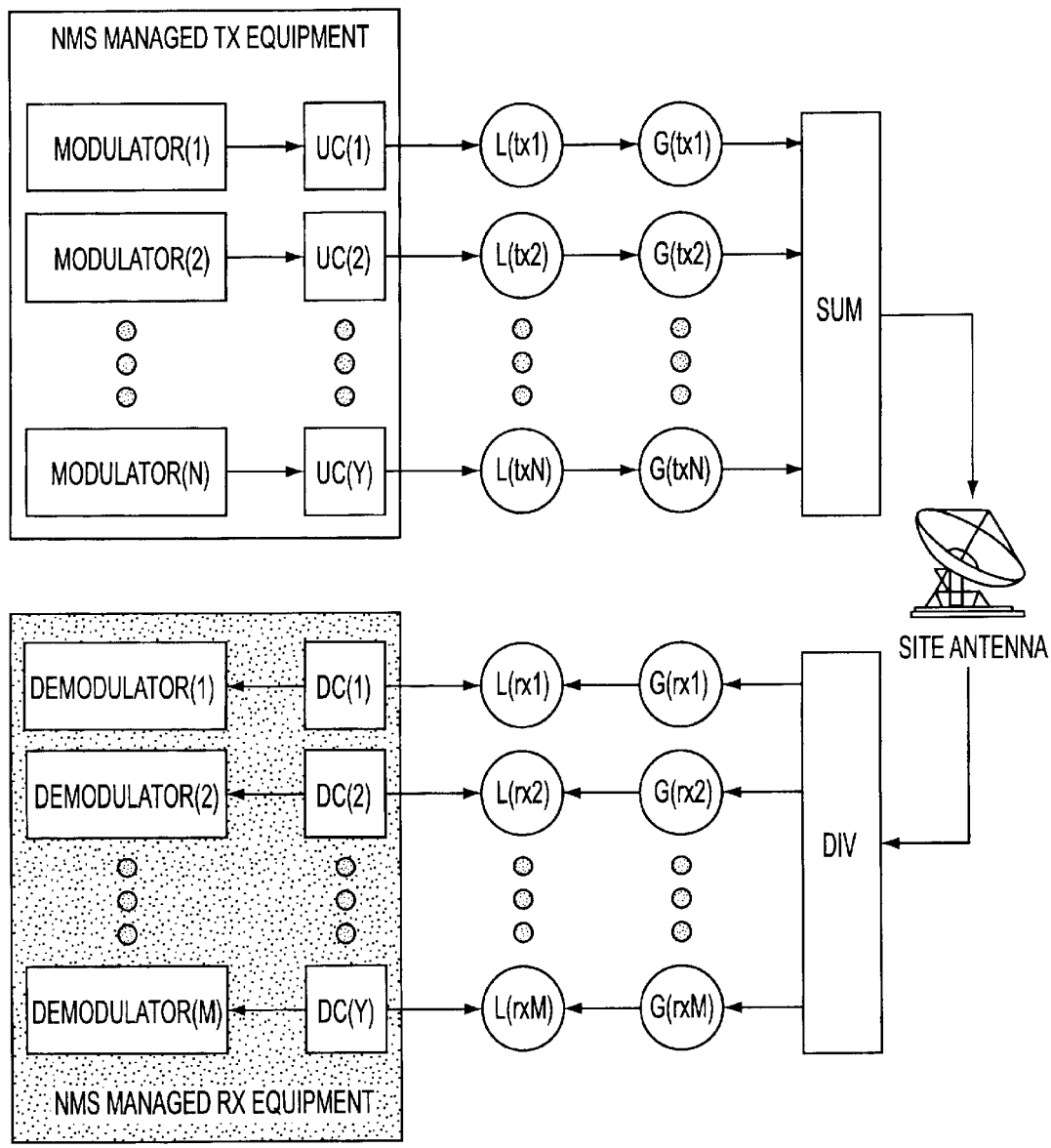
FIG. 6 is a functional schematic showing the elements of a transmission model that are controlled by the semi-autonomous ICs of the present invention.
Figure 7:
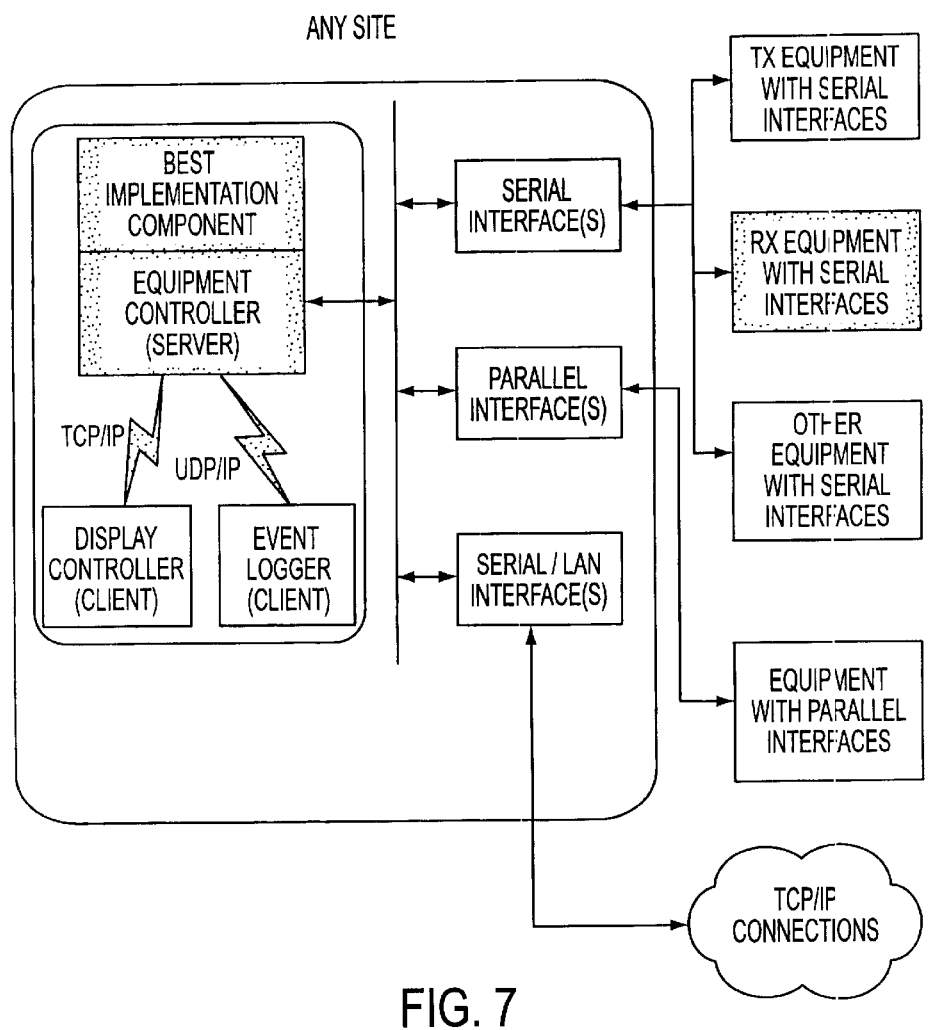
FIG. 7 shows a further functional schematic of the IC systems.
Figure 8:
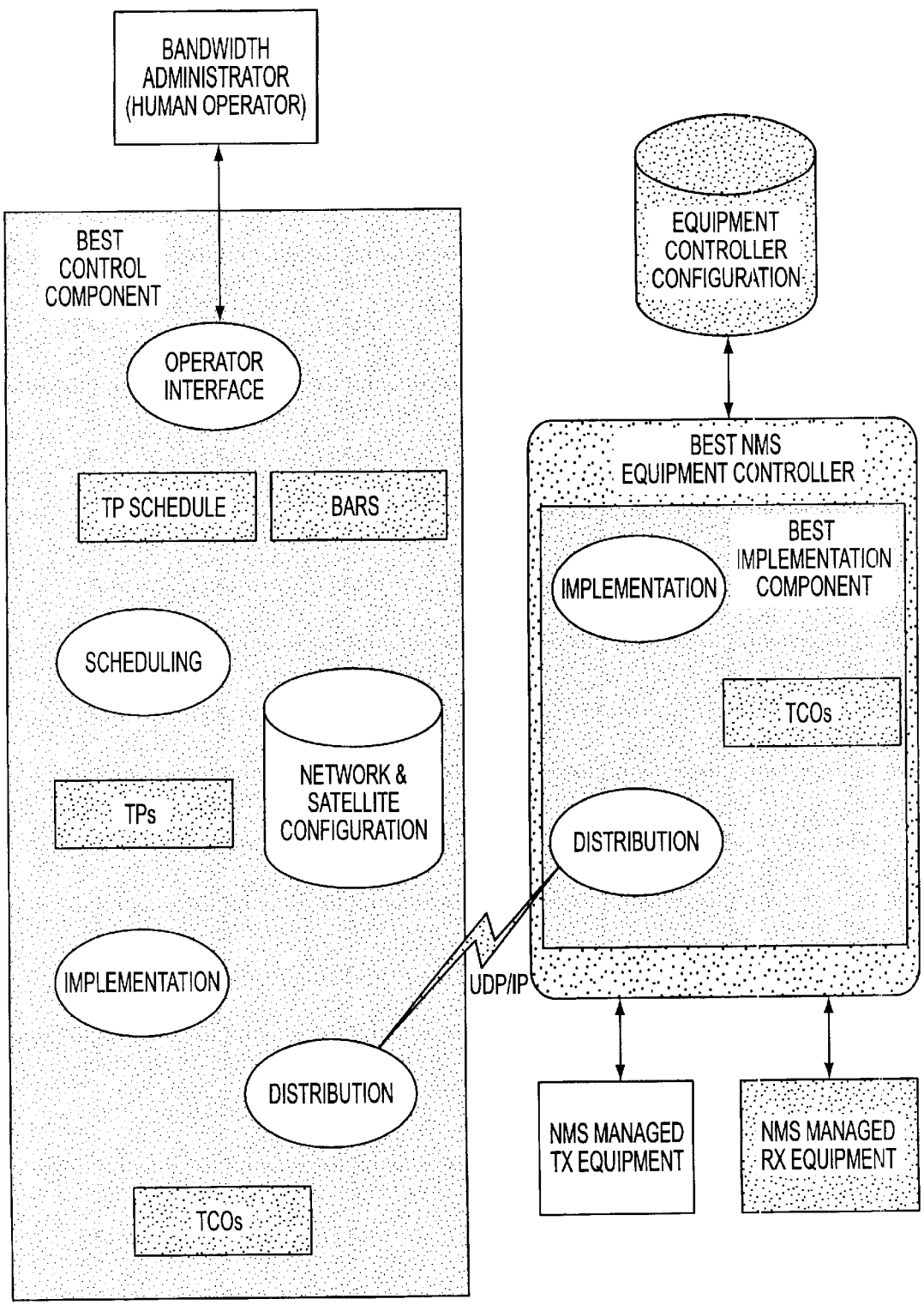
FIG. 8 is a functional schematic showing the software process architecture of the semi-autonomous network management component.

The MC includes an operator interface for configuring, monitoring, and controlling the capacity allocation activity in a wireless network. It may be a Win32 application that runs on a Windows NT workstation which may be located at a network operations center (NOC). Configuration, monitoring, and control of the capacity allocation may be accomplished with the management component. The MC communicates with the other software component, the IC, using the Internet Protocol (IP) family of network protocols as illustrated in FIGS. 4 and 5.

The IC is the application that may communicate with the physical hardware elements implementing the communications links in a wireless network. The IC may be a Win32 application that runs on a computer located at each site in the network. The IC may read a set of configuration files that describe the network equipment to be monitored and controlled. These configuration files may be text files and may be created and modified with a text editor program. In general, the configuration files are re-usable, that is the same configuration file may be used at multiple sites if the same network equipment is used at both sites.

As discussed above, the MCs and ICs communicate by exchanging IP messages. FIG. 5 is a representation of the connectivity between the management component and the IC in a wireless network. The IP connections may be implemented on the satellite network, through the Internet, or through a private network. A second physical communication path between the MC and the ICs may be used to establish IP communications. Typically, ICs do not communicate with other ICs; however, communication links may be established between components to further communication with the MC.

The management system is designed around several elements. These are the

Transmission resource
Site
Transmitter
Receiver
Transmission element
Transmission plan
Implementation
Schedule
Execution time A transmission resource may be a portion of a wireless capacity (power and bandwidth) that may be used by the transmitters in a network. A site may be a collection of transmitters and receivers controlled by a single IC. Normally one IC controls all of the transmitters and receivers at a network site. However, the transmitters and receivers at a network site may be controlled by more than one IC. For example, this may occur at a hub site in a satellite network with a star configuration.

A transmitter is an equipment element that modulates an information signal so that it may access a wireless media. A receiver is an equipment element that demodulates a signal received from a wireless media to recover the information from the broadcast signal. A transmission element may be a transmitter or receiver in the network configuration. Although transmitters and receivers may be different and perform different functions, the management component may perform some operations in which transmitters and receivers are both treated the same way. For example, the MC may audit the status of all transmitters and receivers in the network. The management component may not distinguish between transmitters and receivers when performing this auditing operation.

A wireless link may be created when an information signal is modulated by a transmitter and then demodulated by one or more receivers. A wireless communication network is a collection of communications links that enable information transfer among the sites in the network. Each link requires some of the transmission resources available to the wireless network. The allocation of the available transmission resources among the transmitters in a network is a transmission plan. These transmission plans may define the information capacity and connectivity requirements between the transmitters and receivers in the network.

Only transmitters may need to be specified in a transmission plan. Transmitters generate the signals that use transmission resources. The number of receivers demodulating a wireless signal does not affect the amount of transmission resources (bandwidth and power) used to implement the link.

Implementation may be the process of configuring the transmitters and receivers in a wireless network to allocate the transmission resources as specified in a transmission plan. The management component may implement a transmission plan by sending orders to the ICs controlling the transmitters in the transmission plan and the receivers listening to those transmitters. These orders may specify the transmission parameters for the transmitters and receivers and when they should be implemented. The IC may send the equipment-specific commands that implement the transmission parameters at the specified time. The implementation schedule may be a list of all transmission plan implementations that may automatically be executed in the future. The schedule may be maintained by the MC application. An operator may add implementations to the schedule, remove implementations from the schedule, and move existing implementations to different times. An execution time consists of a transmission plan and the time at which the transmission will be implemented. The time may be a recurring time, for example 1200 UTC every day or 0600 UTC every Monday. The implementation schedule may be built from execution times.

The information architecture of the system applies primarily to the structure of the database maintained by the Management Component and may define the structure of the messages exchanged between the management component and ICs.

The information maintained by the management component (network configurations, transmission resource configurations, transmission plans, etc.) may be stored in a relational database.

The management component may require information about the wireless networks that it manages. A network may be viewed as being composed of sites, transmitters, and receivers. Information about these objects, e.g., sites, transmitters and receivers, and the relationships among them may constitute a network configuration. A network may be a collection of sites that are linked by transmission resources. The following information may be specified for each network managed by the system:

Name
Transmission resources available for use by the network

The system may maintain the following information for each network:

Network ID
Status
Sites in the network

A site may be the physical location of an antenna in a wireless network. In addition to an antenna, a site may have at least one transmitter or receiver. The system may require that the following information be provided for each site:

Name
NMS IP address
Location (street address, geographic coordinates, etc.)
Contact information (telephone numbers, operators' names, radio frequencies, etc.)
Antenna parameters (size, gain, etc.)

The system may maintain the following information for each site:

Site ID
Status
Network to which the site belongs
 Transmitters at the site
 Receivers at the site
Time of last management component transmission to site
Time of last IC response from site In the system, a transmitter may comprise the equipment necessary to convert a digital data stream into a carrier for transmission over a wireless resource. The system may require that each transmitter be uniquely named. The system may maintain the following information for each transmitter:

Transmitter ID
Status (UP, DOWN, FIXED, UNKNOWN)
Site where the transmitter is located
Receivers that should be receiving the transmitter's carrier(s)

The system may track the status of the transmitters in a wireless network. Possible status values for the tracked components may be:

UP the transmitter is currently generating a carrier and is under the control of the management component DOWN the transmitter is not generating a carrier but is under the control of the management component FIXED the transmitter is generating a carrier and the management component knows the characteristics of the carrier but the transmitter is not under management component control UNKNOWN the management component does not know if the transmitter is generating a carrier In the system, a receiver may comprise the equipment necessary to receive a carrier transmitted over a wireless resource and recover the digital data stream. The following information may be specified for each receiver:

Name

Transmitter of the carrier the receiver should receive

The system may maintain the following information for each receiver:

Receiver ID

Status

Site where the receiver is located

A pool may be a collection of transmission resources available for use by the managed networks. Each transmission resource is a portion of transmission capacity (power and bandwidth). The following information may be required for each pool:

Name

Transmission resources in the pool

The system may maintain the following information about each pool:

Pool ID

Networks using the pool

A transmission resource may be a portion of transmission capacity (power and bandwidth). The system may require the following information about each transmission resource:

Description (transponder, provider, etc.)

Start frequency

End frequency

Translation offset

Power allocation

Cost metrics

The system may maintain the following information about each transmission resource:

Transmission resource ID

Pool to which the Transmission resource belongs

A transmission plan is an allocation of transmission resources to one or more carriers in a wireless network. The system may specify the following information about a transmission plan:

Execution time

Duration

Comments

The system may maintain the following information about a transmission plan:

TP ID

State (UNSCHEDULED, SCHEDULED, PENDING, READY, STARTING, ACTIVE, COMPLETED, or CANCELLED)

BARs satisfied by the TP

The system may manage sites with multiple transmitters and receivers. Therefore the system maintains a naming scheme for identifying a specific transmitter or receiver at a site.

Figure 9:
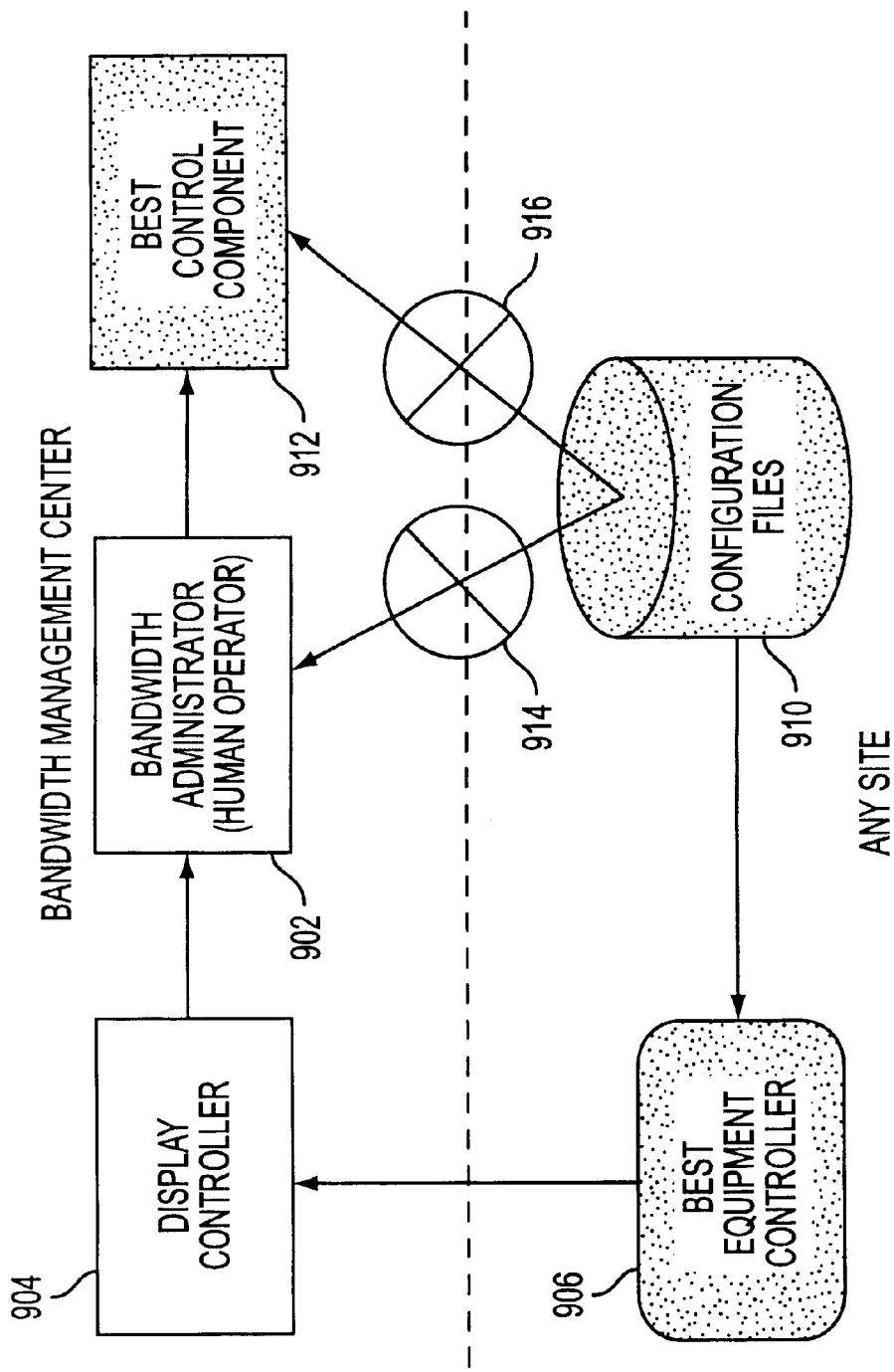
FIG. 9 is a functional schematic of the information flow in the semi-autonomous components of the present invention.
Figure 10:
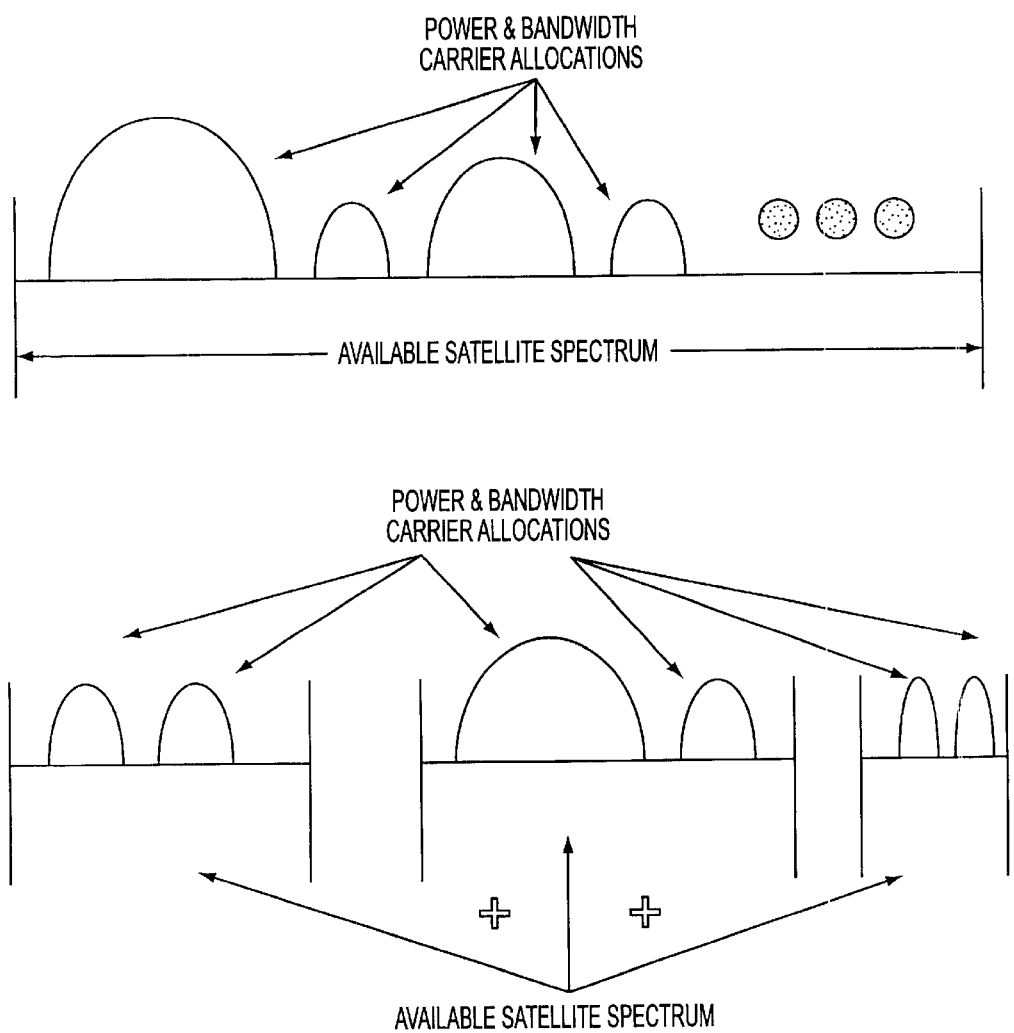
FIG. 10 is a graphical depiction of the transmission plan allocation of available spectrum.

FIG. 9 may represents the flow of hardware identification information from the IC configuration files to the management component. The identification information may originate in the configuration files generated for a site in a network. The configuration files for a site may be read by the IC.

FIG. 9 shows the information flow in the system. Each transmitter and receiver at a site may be designated by an equipment class. Each member of a class is assigned an instance number. Together, the equipment class and instance identify a unique transmitter or receiver at a site. A Bandwidth Administrator (902) may supply the hardware identification when configuring the transmitters and receivers of a site for bandwidth management. The flow of information shown in FIG. 9 simplifies network configuration maintenance and reduces the risk of problems due to inconsistent configuration information in the network. The circles with a slash (914, 916) illustrate that neither the Bandwidth Administrator (902) nor the management component (906) require access to the configuration files (910).

The system software components may exchange information by sending and receiving messages using network or external connections. The management process may communicate with all of the IC processes. Each IC communicates only with the management component.

The User Datagram Protocol (UDP) of the Internet Protocol (IP) suite may be used to transport the inter-process messages. The system may use the combination of IP address and UDP port to identify the ICs in the network. Site identification information may not be required in the message if the IP address and port are already available in the IP and UDP headers.

Figure 15:
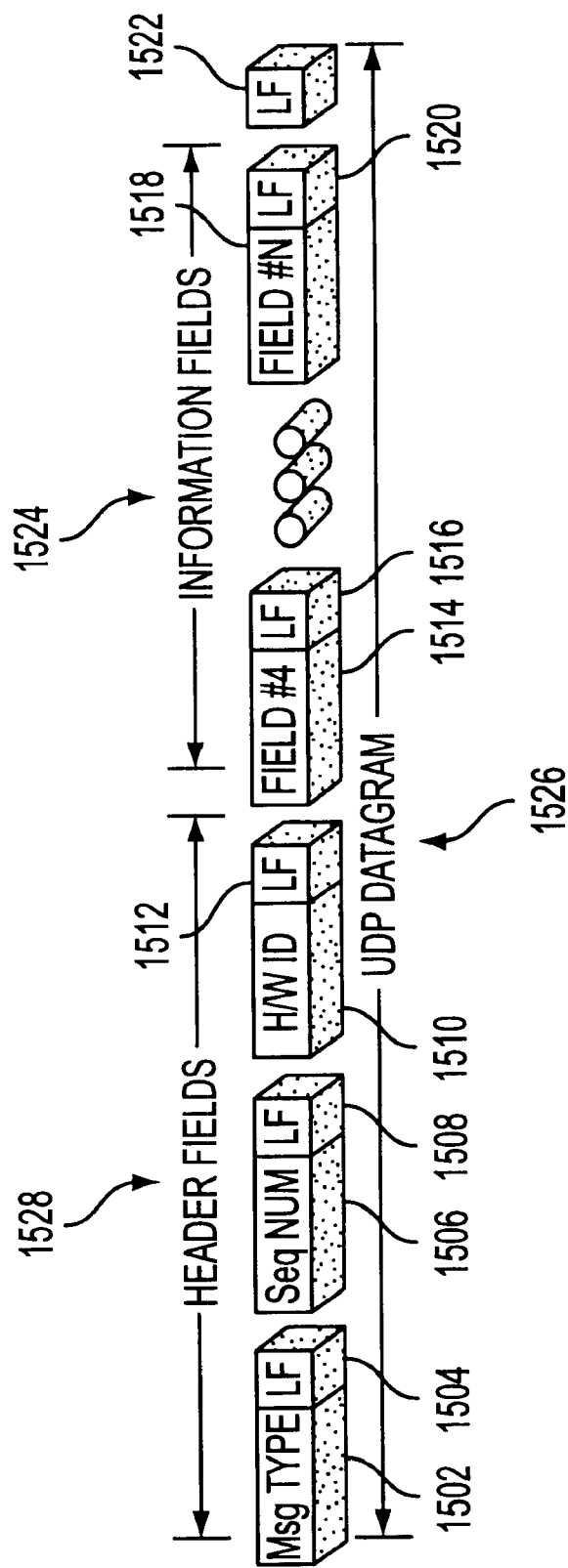
FIG. 15 is a graphical depiction of a UDP datagram format employed in the management components.
Figure 16:
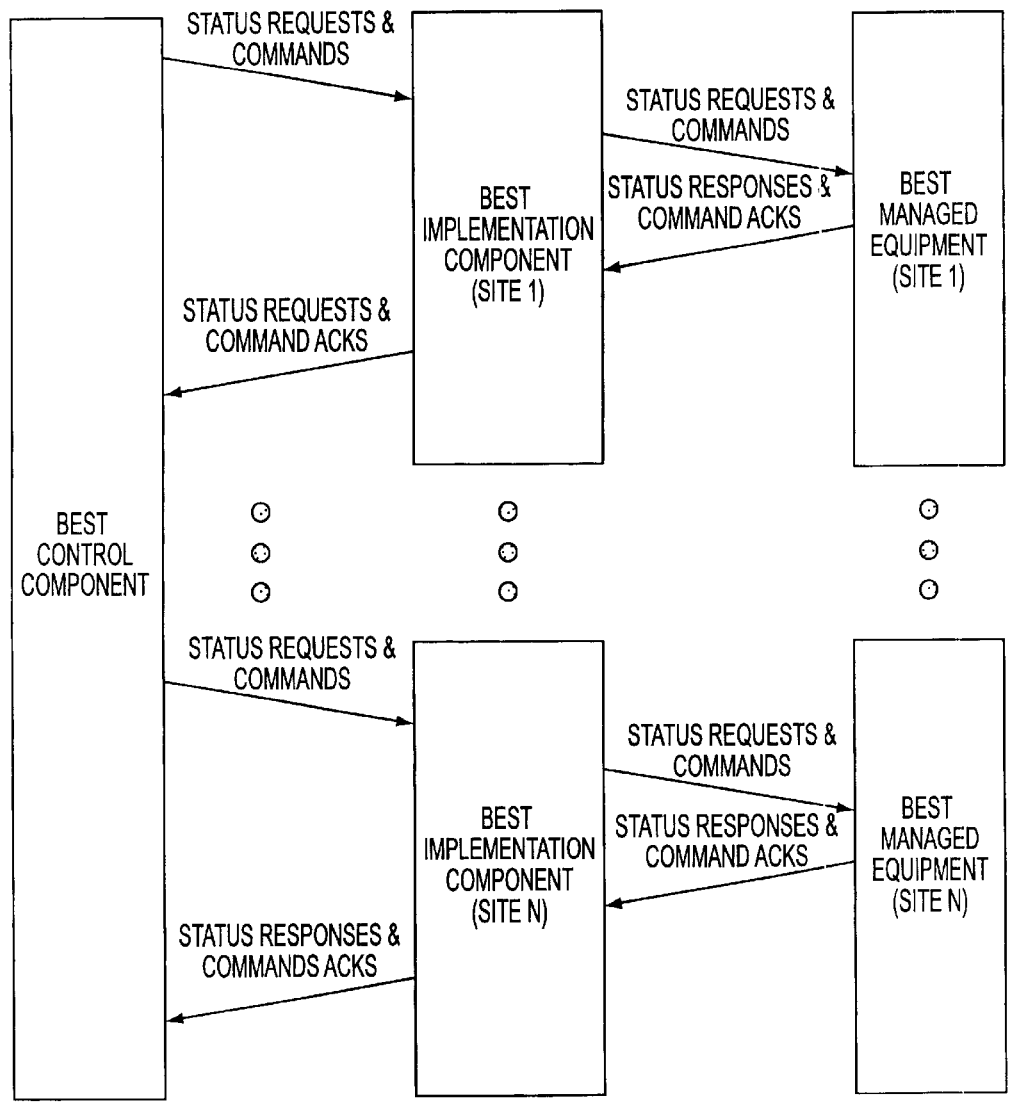
FIG. 16 is a functional schematic of the request/command flow direction of the present invention.
Figure 17:
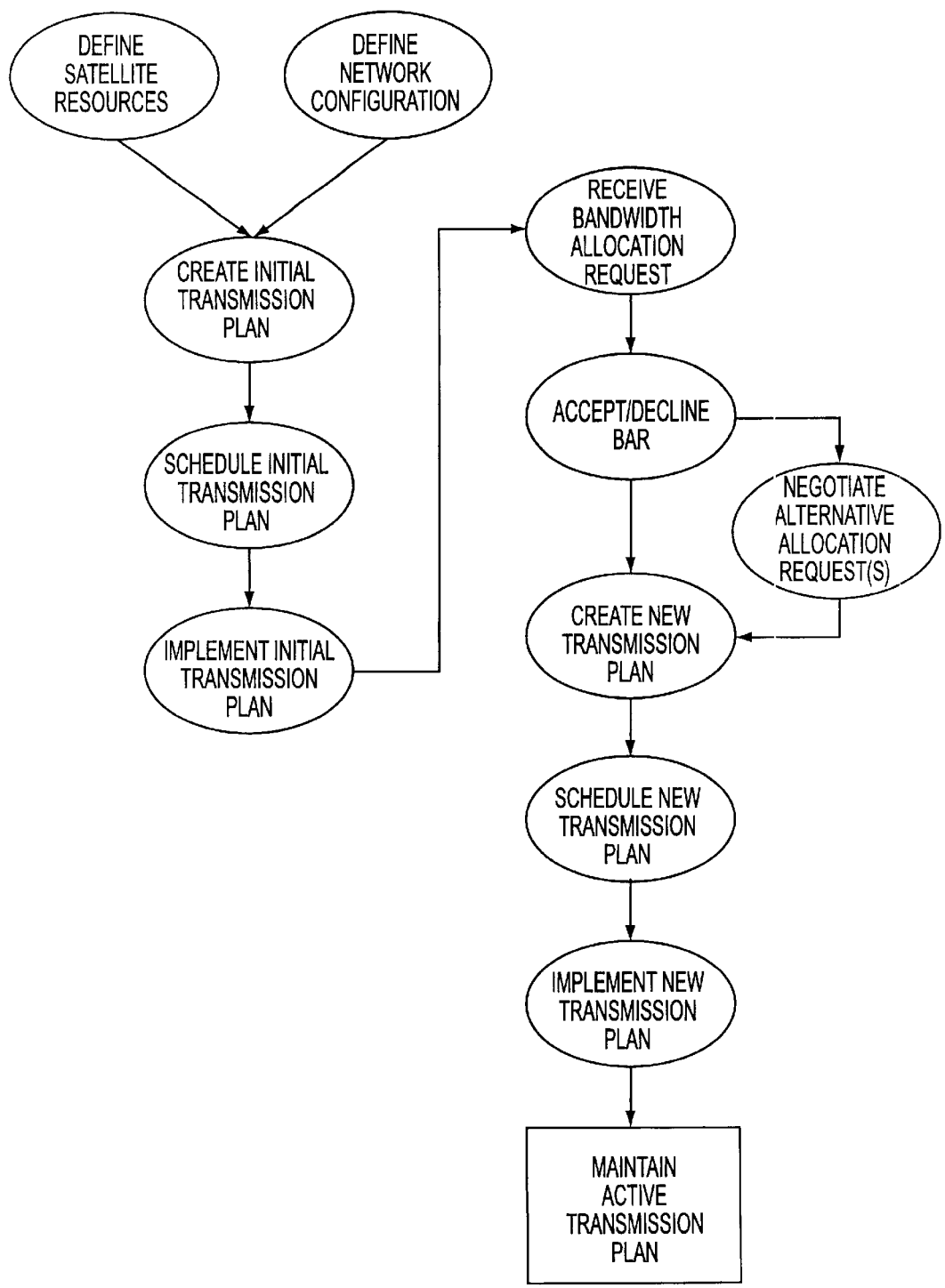
FIG. 17 is a flowchart illustrating a method of grading, employing, and implementing transmission plans within the network.

The management and ICs may communicate using several types of messages. Although each type of message contains different information and fulfills a different purpose, the message types share some common characteristics as shown in FIG. 15.

A message is sent as a single UDP datagram

Only ASCII characters are allowed in a message

A message is a series of information fields

Fields are terminated with an ASCII linefeed (LF)

A message is terminated with an empty field (single LF)

The first three fields are the same for any message (message type, sequence number, and hardware identification)

Although system messages contain only ASCII characters, the messages may be compressed before delivery via UDP. Messages may then be uncompressed after receipt. Fields #4 through #N (1514, 1518) in FIG. 15 are information fields (1524). The fields prior to the information fields in a BMF message are header fields (1528).

Header fields may be present in system messages (1528). Typically, the order and format of the header fields are the same, regardless of message type. The format of a header field is simple: a string terminated by an ASCII linefeed (LF) character (1504, 1508 and 1510). The string can contain any printable ASCII character except LF. The management and ICs may communicate using the following message types:

Transmission Control Order (TCO)

Abort Order (ABRT)

Acknowledgment (ACK)

Audit Request (AREQ)

Audit Response (ARSP)

The mnemonic in parentheses after each message type is the identifier used in the first field (1502) of a system message (1526). After the message type field, the next field in a system message is a sequence number (1506). The management component maintains a sequence number for each piece of managed equipment (e.g. receiver or transmitter) in a network. The IC may use the sequence number from a request message in the response message.

Sequence numbers may be used to match responses (ACK or ARSP) with requests (TCO, ABRT, or AREQ). The use of sequence numbers (1506) prevents confusion when multiple responses are received when multiple requests were sent due to message delivery delay or temporarily unavailable components.

Figure 1:
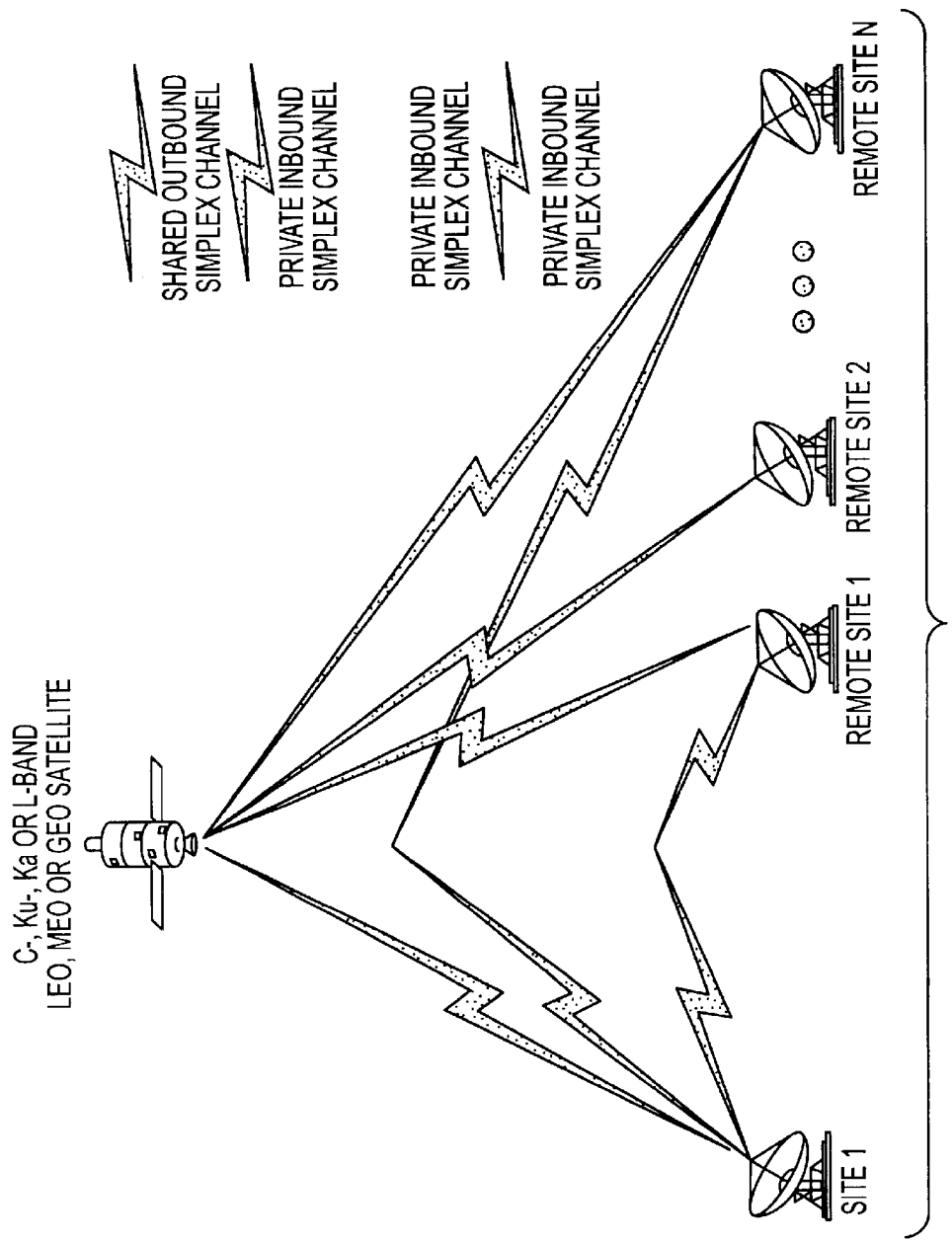
FIG. 1 is a pictorial schematic of a star topology satellite network showing a shared outbound simplex channel and a private inbound simplex channel.
Figure 2:
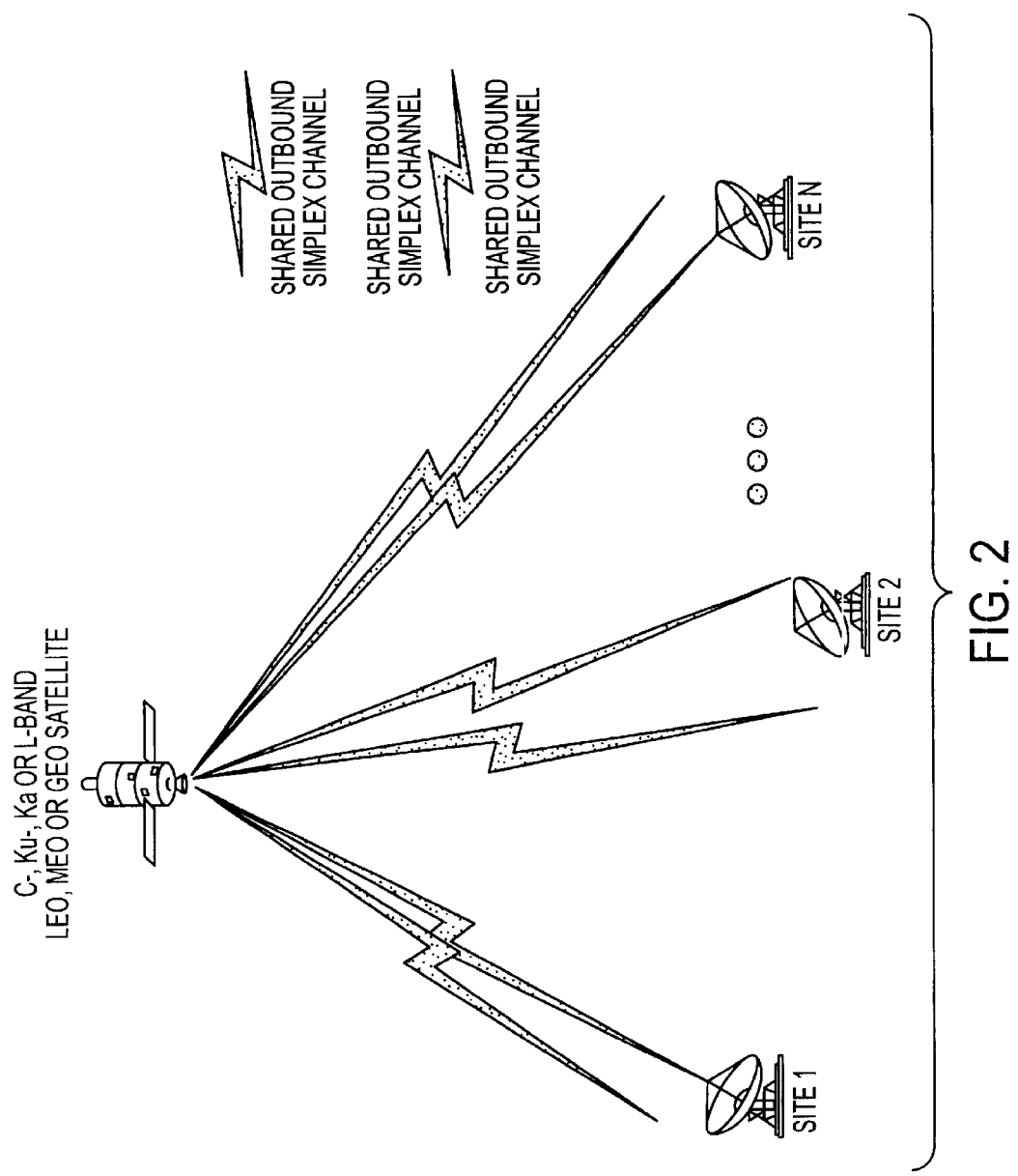
FIG. 2 is a pictorial schematic of a mesh topology for a satellite network showing shared outbound simplex channels.
Figure 3:
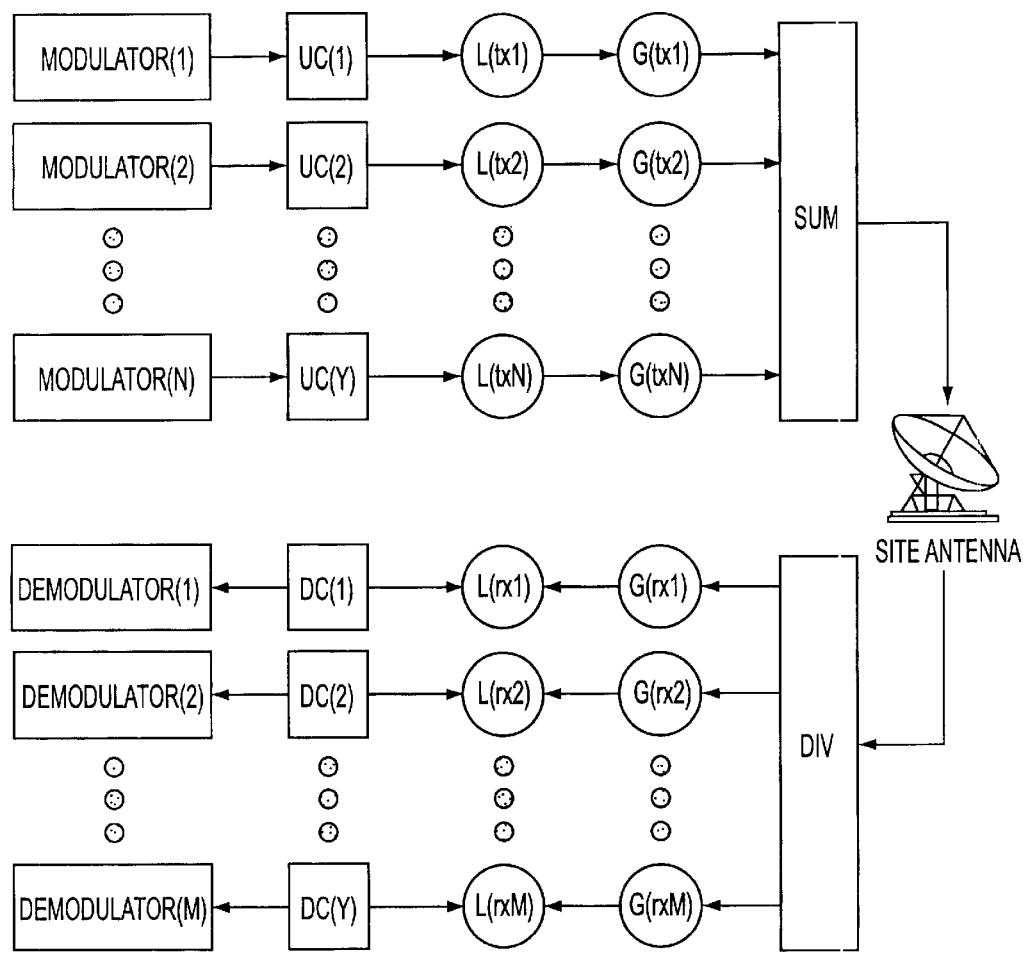
FIG. 3 is a functional schematic of a transmission equipment model depicting modulators, up converters, and the loss and gain elements in the circuit, the site antenna, and the corresponding receiving circuits showing gain and loss elements, the down converter, and the demodulator.
Figure 18:
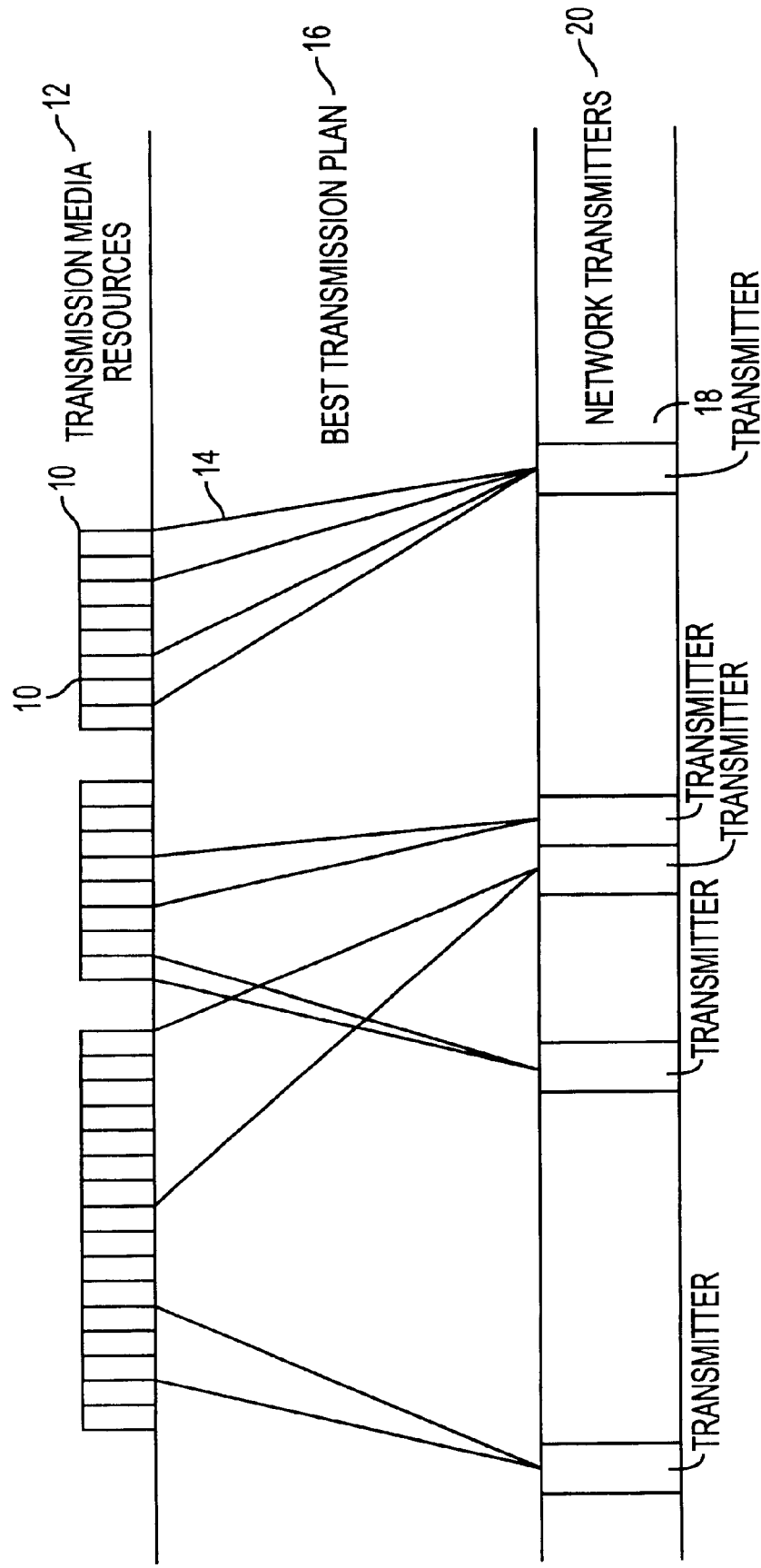
FIG. 18 is a graphical depiction of how the methodology of the present invention views transmission media as resources.

FIG. 18 illustrates a transmission plan for allocating transmission media resources among transmitters in a network. FIG. 18 shows that a transmission media can be divided up into discrete segments (10). A network management plan can view discrete segments (10) of bandwidth as discrete transmission media sources (12). A transmission plan (16) may be used to map a network transmitter (18) through a link (14) to a predefined transmission media resource (12). For example, transmission network transmitter (20), in particular transmitter (18), may be mapped through transmission plan (16) to two discrete segments (10) through link (14). The network media resource may be a star topology as shown in FIG. 1 or a mesh topology as shown in FIG. 2.

Network transmission media resources may also be on separate networks. For example, a first network transmission resource may be capacity from the INMARSAT satellite network or through private networks on a C, KU, KA or L-Band. The network transmission resources may be further augmented by low earth orbiting satellites, medium earth orbiting satellites or geosynchronous satellites. Low earth orbiting satellites may be represented by the Iridium system employed by Iridium, Inc., whose discrete bandwidth allocation methodology is herein incorporated by reference. Geosynchronous satellites may also provide additional transmission resources as represented by the Inmarsat or Intelsat satellite services whose bandwidth allocation methodologies are herein incorporated by reference.

The management component or the ICs do not need to be in direct control of the bandwidth allocation to utilize transmission media sources. For example, bandwidth allocation on the Iridium satellite system may operated independently of the management component and the ICs. However, the bandwidth allocation methodologies of, for example, the Iridium network, may be employed to treat the resultant communication path as a transmission media resource under control of the management component. Indeed, multiple carriers from a third-party system may be allocated in discrete predefined units, such as discrete segments (10), shown in FIG. 18, for utilization by the present invention as a media resource.

Figure 19:
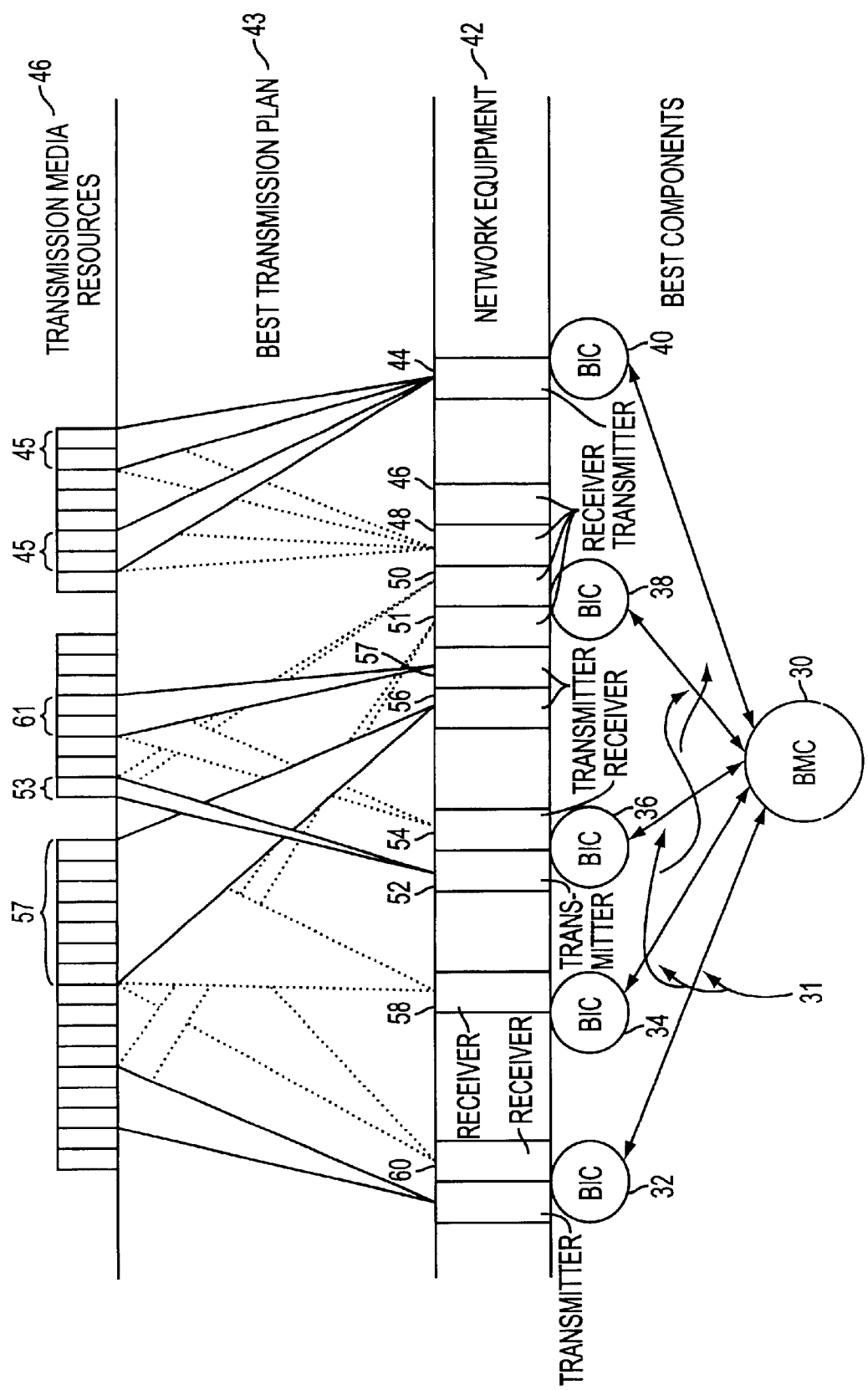
FIG. 19 is a graphical representation of the methodology of the present invention allocating transmission media resources.

FIG. 19 is a graphical depiction of network elements, ICs, a management component and a transmission plan. A central controller of the present invention may be represented by Management Component ("MC") (30). MC (30) is in communication with a plurality of ICs ("ICs") (32, 34, 38, 40) through links (31). Each IC may represent a particular site that is under network management control by the MC. Each IC may have network equipment (42) under its control. For example, IC (40) has transmitter (44) under its control and BIC (38) has receivers (46, 48, 50, 51) and transmitters (56, 57) under its control. IC (36), however, has receiver (54) and transmitter (52) under its control. The present invention implements a transmission plan (43) through a mapping of network equipment (42) to transmission media resources (46). For example, transmitter (44) has been allocated transmission media resource (45) for reception by receiver (48) as indicated through up link and down link mappings in transmission plan (43). This may represent a combined transmission media resource whose overall capacity is the entire discrete amount allocated at transmission media resource (45). For example, a dynamic bandwidth requirement for a connection at a predefined class of service may be split into two discrete carriers. The discrete carriers may be represented by the two discrete media resources allocated at transmission media resource (45) to provide an overall throughput necessary to accommodate the predetermined capacity to support the class of service. The excess capacity may be used to provide the time recovered to reassemble the packets at receiver (48). This methodology is useful in the instance where, for example, a class of service from a particular end-user exceeds the network capacity to satisfy the demand on a single channel or contiguous media resource. For example, the class of service requires a connection that exceeds the bit rate capacity of the modulator at a particular transmitter, but two modulators would supply ample bandwidth for the class of service. In that instance, the IC or the management component could divide a packet data stream from the end-user device onto the two different modulators. In that instance, multiple transmission media resources may be allocated to satisfy the overall class of service demand.

A further representative example of a transmission plan employed herein is a broadcast from IC (38) through transmitter (56) which has been allocated transmission media resource (57). Transmission media resource (57) may be used for reception by both IC (34) and receiver (58) and IC (32) and receiver (60). This is an example of a point to multi-point broadcast. The point is represented by up link transmitter (56) and the multi-points are represented by receivers (58) and (60). One representative application of such a plan is, for example, a broadcast message from transmitter (56) to two simultaneous sites represented by ICs (32) and (34).

Another representative example of a transmission plan employed herein is transmitter (57), under control of IC (38), having an allocation of transmission media resource (61) for reception by receiver (54). IC (36) has transmitter (52) and transmission media resource (53) allocated for reception by receiver (50) at IC (38). This transmission plan may represent an asymmetric transmission, i.e., the outbound channel from IC (38), represented at transmitter (57), has more media resources allocated which may indicate a higher bandwidth or higher data rate for reception by IC (36) through receiver (54) than the outbound channel from IC (36) through transmitter (52) through transmission media resource (53) for reception by receiver (50) to IC (38). Other representative permutations of the transmission plans employed herein are shown in FIG. 19 through the mapping transmission plan (43).

Figure 20:
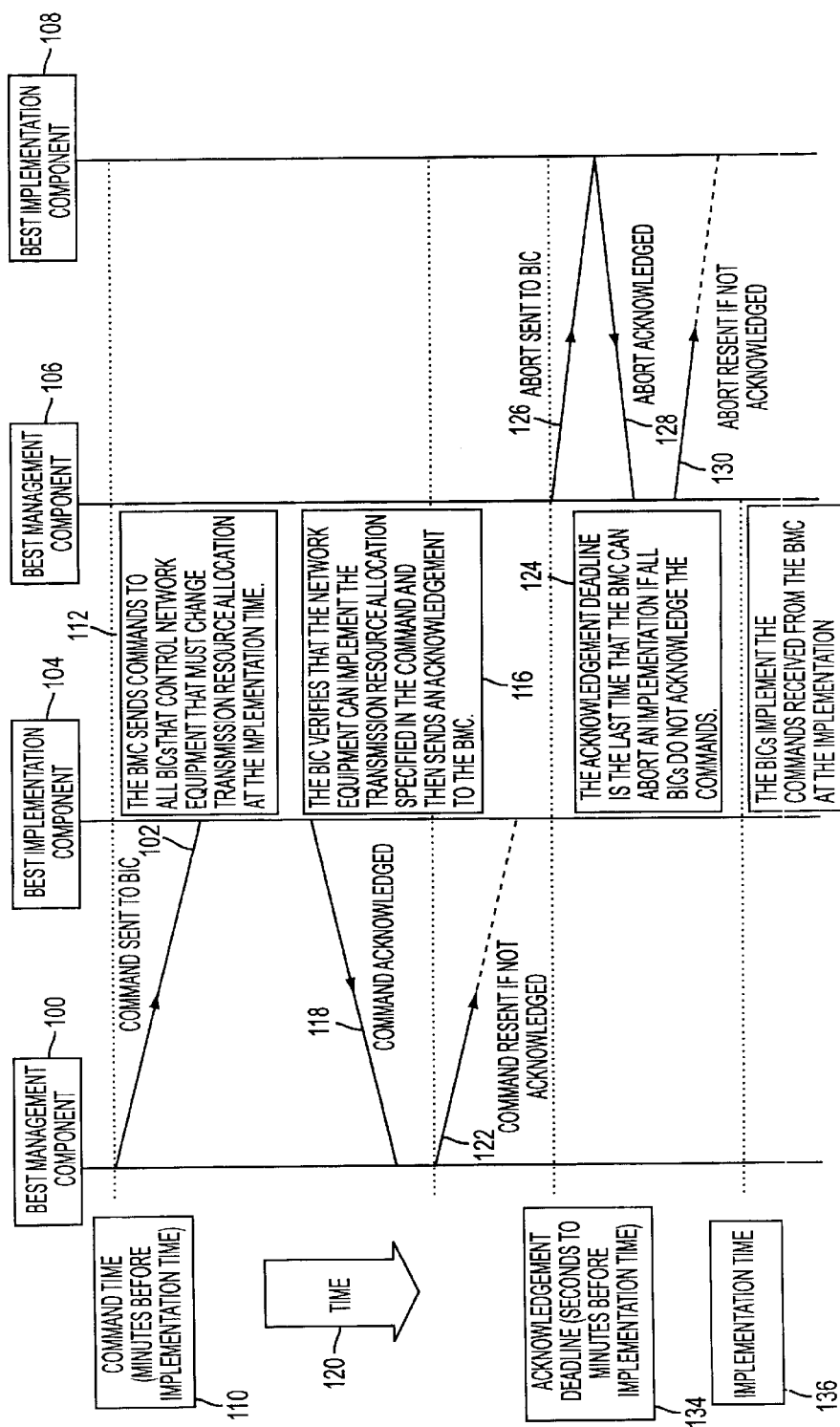
FIG. 20 is a graphical depiction of a timing transmission plan implementation.
Figure 21:
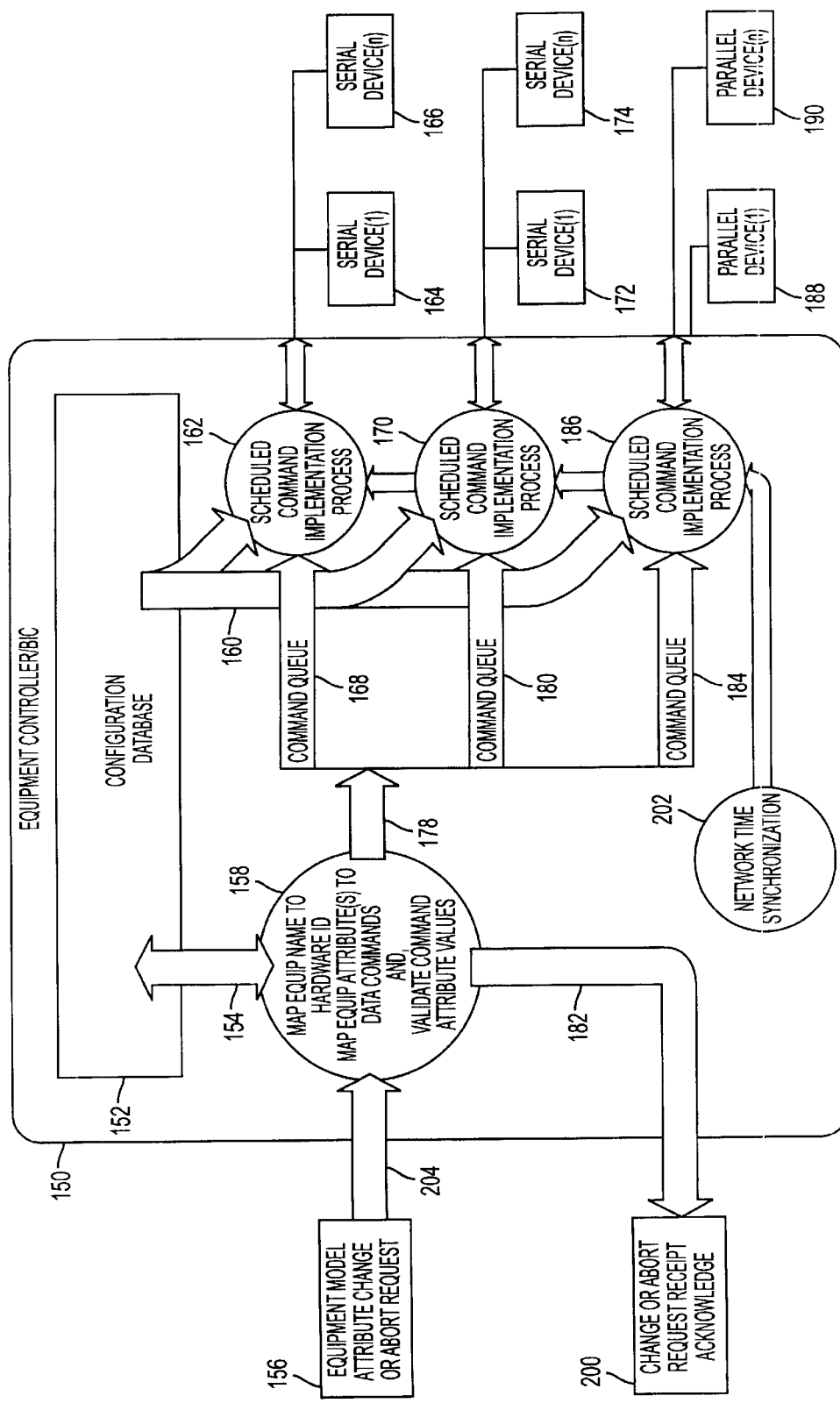
FIG. 21 is a graphical depiction of the command processing flow in the equipment controller.

FIG. 20 demonstrates the timing of how a representative transmission plan may be implemented by the management component. The transmission plan implementation begins with management component (100) having a predetermined command (102) to send to the network at a predetermined command time (110). Command(s) (102) is sent to IC (104) that must change transmission resource allocation at the implementation time. This command is stored in IC (104) and the time to implement the command is decoded by IC (104). IC (104) then sends a command acknowledgment (118) back to a management component (100). At this juncture, command (102) is loaded and awaits deployment at MC (100) at the predetermined command time (110). Command (102) is resent (122) if acknowledgment of receipt of command (118) is not received before a predetermined time.

It is understood that MC (100) may have a list of every IC (104) in the network that must change. This list may include the TCP/IP address for each IC (104) so MC (110) may send a UDP/IP message with a command (102) encoded therein. An acknowledgment deadline (134) is included that may be seconds before the implementation time for the new transmission plan. The acknowledgment deadline (134) may be the last time at which MC (106) can abort an implementation if each IC (104) does not acknowledge the commands.

It is understood that IC (104) may use a coordinated implementation to assure that no IC (104) is stranded when the transmission plan is implemented. During the abort sequence, which occurs if IC (104) has not acknowledged command (102) at step (118), MC (106) sends an abort message (126) to IC (108) that were sent command (102). IC (108) may send an abort acknowledgment (128). Abort command (126) is resent at step (130) if it is not acknowledged. The implementation time (136) defines a time at which the transmission plan is executed by IC (104). It is understood that at that point, all necessary ICs (104) have acknowledged command (118) and are counting down in a synchronized fashion to the predetermined implementation time (136). It is understood that the command acknowledged may include an indication of the time at which an IC (104) received command (102) to verify that the implementation time (136) is synchronized among each IC (104). Once all commands have been acknowledged and the network is ready to implement the plan, at implementation time (136), the ICs (104) implement the command(s) received from MC (100) at implementation time (136).

At this point, a new transmission plan, as depicted in FIG. 19, may be implemented by the network. The communication path between MC (30) and ICs (32, 34, 36, 38, 40) is independent of the transmission media resources. As depicted in FIG. 19, a transmission path (31) is generally over a TCP/IP network (e.g., the Internet), as widely known in use today. However, it is within the scope of the present invention to define a guard or maintenance channel which may be a point-to-multi-point transmission scheme from MC (30) to and from ICs (32, 34, 36, 38, 40) wherein an IC co-located with MC (30) assures that a network connection is present between ICs (32, 34, 36, 38, 40) and a MC allocated transmitter, such as transmitter (44). In such a case, each IC (32, 34, 36, 38, 40) ready to implement the new transmission plan may have a receiver dedicated to monitor transmitter (44) to receive abort command (126) if each IC (32, 34, 36, 38, 40) does not acknowledge. This assures a fail safe or guard channel back-up plan to abort implementation of a new transmission plan if one or more IC (32, 34, 36, 38, 40) loses communication with the management component.

Commands may enter the IC (150) from a plurality of sources, one of which may be directly from the MC. Node (158) may be a UNIX daemon or a Windows NT™ service which monitors a TCP/IP address. Thus, commands from MC (156) may enter IC (150) through a port (204). Upon entering IC (150), network commands may be mapped at step (158) in conjunction with configuration database information to output specific commands (178) to the network equipment. These commands may be put into a command queues (168, 180, 184) which is then directed through a scheduler process 162, 170 and 186. For example, scheduled command implementation processes (162, 170, 186) may output commands to the appropriate receiver, transmitter or network device through a serial port (164, 166, 172, 174) or a parallel port (188, 190). Command queues (168, 180, 184) may be a polled or interrupt driven queue. That is, the schedule command implementation process (164) may periodically poll queues (168, 180, 184) to determine whether a command is present, and if so, pass the command on to the appropriate network device interfaced (e.g., serial device driver (164, 166) or the command key may be a period.

The command queue may alternatively be interrupt driven. That is, when a command enters queue (168, 180, 184), for example, command queue (168) may send an interrupt to the command implementation process for the command implementation process to service the command and then pass it to the appropriate network device at the appropriate serial port. It is understood that this process may be used for implementation processes (170, 186) as well.

Command implementation processes (168, 170, 186) may be synchronized to network time (202) to execute commands at the appropriate time. That is, implementation of transmission plans may be synchronized with network time (202) to assure that all network devices reconfigure themselves simultaneously or near simultaneously. Implementation processes (168, 170, 186) may also have data from configuration database (152) to configure implementation process (168, 170, 186) for the particular end-user network device. This provides flexibility in implementation process (168, 170, 186). That is, the implementation may be written as a modular software program which may be modified by configuration database data (160) as implementation process (168, 170, 186) executes. Further to this concept is that MC (156) may address configuration database (152) via link (204) to change configuration database (152) to redefine the end-user equipment. This allows the MC (156) to manage the end-user equipment remotely from the user location at the IC site. IC (150) may communicate through module (158) via link (182) to send acknowledgments (200) back to the MC (156). Command acknowledgments (118) shown in FIG. 20 and order acknowledgments may also be used. FIGS. 21–28 illustrate a step that may be used to confirm receipt of commands or to confirm receipt of an abort command.

It is understood that there are at least two ways in which to map MC commands or at least two ways in which to map MC commands to the end-user device or to a particular port on a IC. First, a TCP/IP address is provided for the IC in command (204) and then, within the UDP command, is a sub-address that may be decoded at (158) addressed to a particular enduser device.

Figure 22:
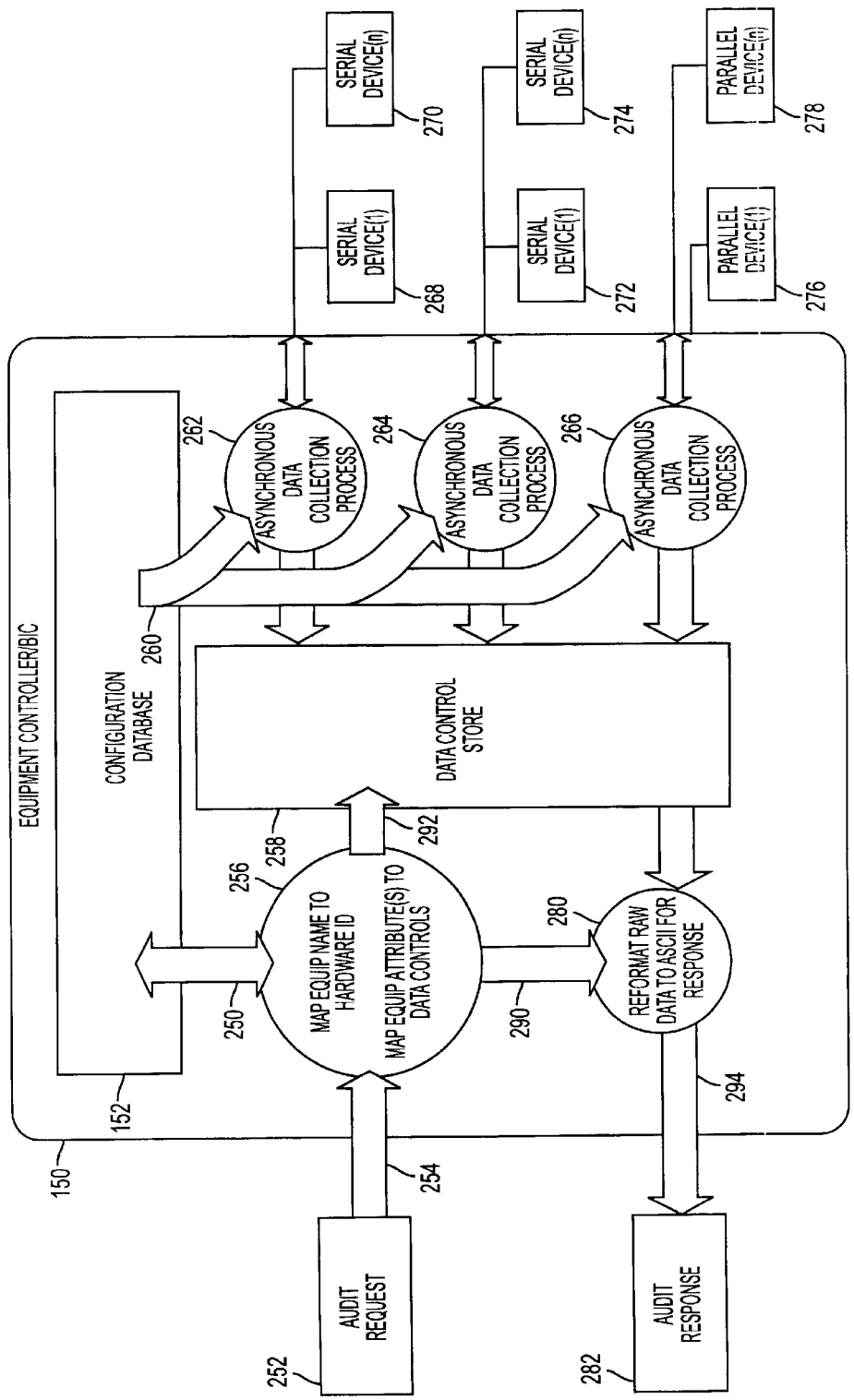
FIG. 22 is a graphical depiction of the process flow for network audit processing.

FIG. 22 shows a graphical block diagram of an audit control process by which the present invention may collect data from network equipment. Equipment controller (150) may have a configuration database (152) which controls the configurations of the IC in relation to the end-user network equipment. An audit request (252) may be received from the MC via port (254). Port (254) may be a user data packet via a TCP/IP network to a particular predetermined address at (256). At (256), an auto request command may be decoded to map an equipment name to hardware identification from those stored in configuration database (152). The process at (256) may also be used to map equipment attributes to data controls (290). These parameters may be passed to the reformat command process at (280) which is used to provide a formatted audit response (282) to the MC.

In one embodiment of the present invention, the MC may establish an asynchronous data collection process (262, 264, 266) for the network equipment at a respective data port (268, 270, 272, 274, 276, 278) for the network equipment. Asynchronous data collection process (262, 264 266) may be interrupt or poll driven.

In the interrupt driven embodiment of asynchronous data collection process (262, 264, 266), the end-user device may send out an unsolicited command via the respective device (e.g., device 268), to asynchronous data collection process (262, 264, 266). The interrupt then invokes the program to service the data condition (or possibly an alarm) from the network equipment. Asynchronous data collection process (262, 264, 266) then moves the data to the data control store block (258) where the alarm or data condition may be stored in the IC. It is understood that the data control store block (258) may be a hard drive or other long term storage means available at the BIC. In a preferred embodiment, the data control store is a non-volatile data storage media and the asynchronous data collection process is a modular program because it is modified from data from configuration database (260) for the particular network device. This provides a flexible programming methodology for the asynchronous data collection process employed in the present invention.

In the polled embodiment of asynchronous data collection process (262, 264, 266), asynchronous data collection process (262), for example, may periodically pole the end-user network device attached to, for example, port (268), to receive data or alarm conditions from the end-user device. The polling rate may be a parameter from the configuration database received via link (260).

In sum, an audit request may be received via port (254) and decoded at (256) to output data from the data control store program (292). Data output from the data control store may be formatted at (280) from parameters past (290) from the audit request. This can provide an auto response (294) back to the BMC (282) in the appropriate and predetermined format.

Figure 23:
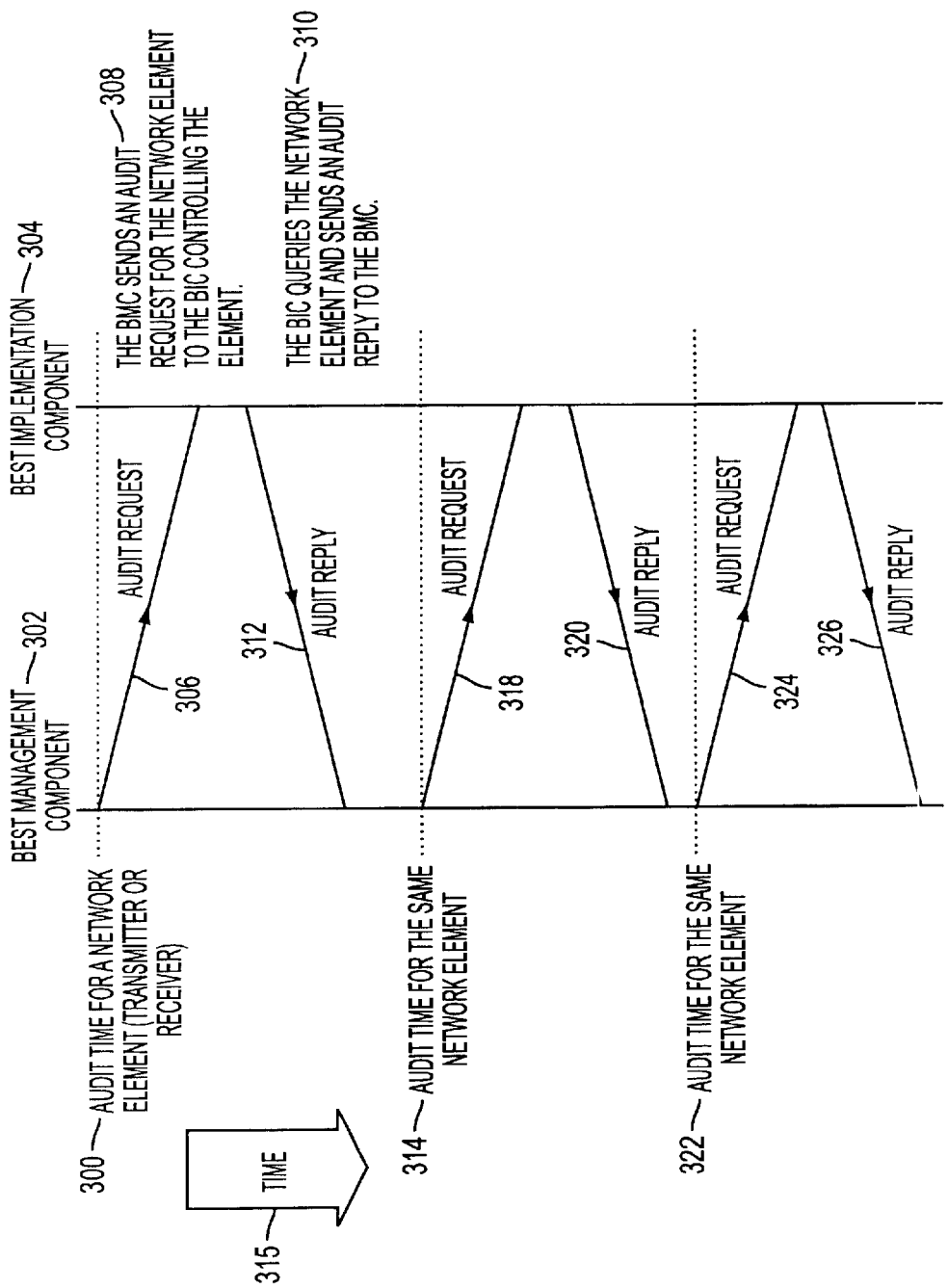
FIG. 23 is a graphical depiction of the auto command flow with respect to timing.

FIG. 23 shows a logic flow representation of a network audit from a MC (302). In FIG. 23, the MC (302) may establish an auto time for a network element, a transmitter or receiver (300). At the appropriate time, MC (302) may send out an audit request (306). It is understood that audit request (306) is directed to the network element and the particular IC controlling that element (308). The IC may then query the network element and send an audit reply (312) to the MC (310). Audit reply (312) is shown in time synchronization (316) after audit request (306).

Initialization or configuration files may be used to implement the invention. Exemplary initialization files are shown in Appendices A–H. For example, a "command.ini" file (shown in Appendix A) may be used to provide user interface command definitions for all network management system equipment supported. The "command.ini" file specifies the menus associated with each control used on a user display.

A "monitor.ini" file (shown in Appendix B) may be used to specify automatic monitoring functions performed by an equipment controller. The "monitor.ini" file may act as the network management system data connection interface definition file.

An "equipct1.ini" file is shown in Appendix C. The "equipct1.ini" file may be used as the network management system controller initialization file. That is, the "equipct1.ini" file specifies some global parameters for the equipment controller application. It may also specify the location of other configuration files if such files are not stored in a default or predetermined location.

Appendix D shows an exemplary "event.ini" file. The "event.ini" file may provide descriptions of network management system events. For example, the "event.ini" file may specify textual responses (to user commands) displayed on a user interface and the asynchronous messages sent to either an event logger or other device.

A "port.ini" file (shown in Appendix E) may be used as the network management system external connection definition file. The "port.ini" file may specify particular serial and parallel ports used by the equipment controller application.

Appendix F shows an example of a "serial.ini" file. The "serial.ini" file may be used as the network management system serial command description file. This file may specify the command and response strings used to communicate with the manage equipment over a serial interface.

An example of a network management system user interface definition file ("panel.ini" file) is shown in Appendix G. The "panel.ini" file may be an the overall specification for the display controller presentation. This file ties together the display controls with specific input/output ports and describes the total graphic user interface for an equipment controller site.

Appendix H shows an exemplary "template.ini" file. The "template.ini" file may be used as the network management system display template description file. This file specifies the graphic qualities of the controls used in the display controller presentation. Graphic qualities may include the position of the graphic control on a display, the type of display object, the name of any required bitmap graphic file, and a reference to any menu associated with the control.

The hardware identification field (1510) may contain information that identifies a specific transmitter or receiver at a site. The hardware identification field may have the format:

HWID=<Class>:<Name> where
<Class> is the type of hardware and
<Name> is the name assigned to a specific piece of hardware in the IC configuration.

The type of hardware may be one of the following classes:
Transmitter (TX)
Receiver (RX)
Upconverter (UC)
Downconverter (DC)

The <Class> portion of the hardware identification field may be one of the mnemonics shown in parentheses. Information fields (1524) and header fields (1528) may share some similarities. Each type of field is terminated with an ASCII linefeed (LF) character (1512, 1522). The primary difference between header fields (1528) and information fields (1524) is that the same header fields are found in all system messages while different messages can have different information fields.

Because of the size of information fields (1524), the format of an information field is more complex than the format of a header field. Information fields may match the format:

<mrnemonic>=<value> where
<mnemonic> is a mnemonic representing the field type and
<value> is a string representation of the field value.

Both the mnemonic and the value of an information field may consist of printable ASCII characters. However, the ASCII character '=' is used to separate the mnemonic and value portions of an information field. Therefore, '=' cannot be present is either the mnemonic or value strings.

A transmission control order (TCO) is sent from management component to an IC to request parameter changes for a transmitter or receiver controlled by the IC.

A TCO may have has the following information fields:

Execution time

Model parameters

The execution time field specifies the time at which the TCO must be implemented. The TCO for each side of a communication link (transmitter and receiver) may have the same execution time to minimize the time the carrier is down during the change. Execution times may be given in UTC. The execution time field may have the format:

ET=<YYYY><MM><DD><hh><mm> where

<YYYY> is the four-digit year number (0000 to 9999),

<MM> is the two-digit month number (January is "01", etc.),

<DD> is the two-digit day of the month (01 to 31),

<hh> is the two-digit hour of the day (00 to 23), and

<mm> is the two-digit minute of the hour (00to 59).

All of the fields in a TCO after the execution time are model parameters. These fields are the parameter values for the transmitter or receiver specified by the hardware identification field of a TCO. Model parameters are specified as a parameter/value pair. The format of a model parameter in a BMF message is:

<mnemonic>=<value> where

<mnemonic> is the mnemonic for a model parameter and <value> is a string representation of the parameter value.

An abort order (ABRT) may be sent to an IC to cancel any pending TCO for the specified hardware. An ABRT does not require any information fields.

An acknowledgment (ACK) informs the management component that the IC received the TCO or ABRT. An ACK is the response message for a TCO or ABRT. When an IC receives a TCO or ABRT, it must send an acknowledgment to the management component. If the IC detects any problems with the TCO (configured hardware does not support a model parameter, hardware ID invalid, etc.) then the ACK will describe the problems. An ACK for an ABRT does not require this problem description. An ACK may have the following information fields:

Execution time (same as in TCO)

Model parameters (only if an error condition exists)

An ACK may have the same information fields as the TCO that is being acknowledged. However, model parameter fields are only present if the IC cannot fulfill that model parameter. For example, if the TCO contained an invalid receiver bit rate but a valid receiver frequency then the ACK would include an information field for the RXR model parameter but not for the RXF model parameter.

An audit request (AREQ) is sent periodically by the MC for each transmitter and receiver in a satellite network. Each AREQ is sent to the BMF IC responsible for managing the specified transmitter or receiver. An AREQ does not require any information fields.

An audit response (ARSP) is sent by an IC in response to an AREQ from the MC. An ARSP is the response message for an AREQ. An ARSP has the following information fields:

Execution time (time ARSP generated)

Model parameters (actual settings)

The format of an ARSP may be almost identical to the format of a TCO: the message contains an information field for all of the model parameters pertaining to the specified piece of hardware. However, the values of the model parameters may be the actual settings of the hardware, not the desired settings.

One purpose of the ARSP is to determine the state of the hardware in the network. A secondary purpose is to check for manually instituted changes to the configuration of the network hardware. For example, an operator at a remote site might manually change the receiver frequency using the front panel of the equipment. The management component periodically requests the current state of all managed equipment to check for parameter modifications not initiated by the management. The execution time for an audit response is the time at which the ARSP is generated.

An ARSP may contain the model parameters for the type of equipment specified by the hardware identification. When the value for a model parameter is not available, the value portion of the field may be "UNKNOWN". For example, if the scrambling state of a transmitter cannot be determined by an IC, the field "SCR=UNKNOWN" may appear in the audit response.

The IC (IC) may read its configuration files at startup and construct memory resident database tables and data objects' to facilitate rapid access to the configuration information stored in those files. Among the data read from the configuration files are the records that describe the equipment that the Management Console (MC) application will attempt to control by its commands to the Equipment Controller. The MC may communicate with the Equipment Controller in message with a format similar to:

Equip=EquipmentClass:EquipmentUnitName

Attribute1=Value1

Attribute2=Value2 where 'EquipmentClass' and 'EquipmentName' are character string values that occur in the IC configuration files as identifying a piece of modeled equipment. The values of 'Attribute' and 'Value' are also represented as character strings and hence the entire dialog between the MC and IC is through text based messages.

The IC configuration files identify one or more pieces of modeled equipment and a set of attributes that the modeled equipment can support. For example, the following section of an 'equipct1.ini' file describes an equipment element known as 'TRANSMITTER:Outbound'. The modeled attributes are identified by the 'EquipModemAttrs' entry and list the values TXF TXR MODT MODR ENCT ENCR DENC SCR PWR CXR as the legitimate attributes of the unit known as 'TRANSMITTER:Outbound'.

[Outbound]

EquipName=Outbound

EquipClass=TRANSMITTER

EquipModelAttrs=ALL TXF TXR MODT MODR ENCT ENCR DENC SCR PWR CXR

EquipAttrSetCmds="" EFDataTxfSetCmd EFDataTxrSetCmd EFDataModtSetCmd

EFDataModrSetCmd EFDataEnctSetCmd EFDataTxrSetCmd EFDataDencSetCmd

EFDataScrSetCmd EFDataPwrSetCmd EFDataCarrierSetCmd

EquipAttrSetCmdParms="TXF TXR ENCT PWR" "TXF" "ENCR TXR" "MODT" "MODR" "ENCT" "ENCR TXR" "DENC" "SCR" "PWR" "CXR"

EquipAttrSetCmdPorts=Serial5

EquipAttrSetCmdAddrs="1"

EquipAttrMonConns=""EFDataTxfMon EFDataTxrMon
   EFDataModtMon
   EFDataModrMon EFDataEnctMon EFDataEncrMon
      EFDataDencMon
   EFDataScrMon EFDataPwrMon EFDataCarrierMon
EquipAttrMonConnPorts=Serial5
EquipAttrMonConnAddrs="1"
AssociatedEquipment=RECEIVER:Demod1

This configuration entry may also associate other configuration entries with the equipment attributes that permit the equipment controller to set (modify) and get (recover) the attribute values from an actual piece of serially attached equipment. The entries in the list of 'EquipAttrSetCmds' refer to entries in the 'serial.ini' file that describe the actual command to be sent. The entries in the 'EquipAttrSetCmdPorts' and 'EquipAttrSetCmdAddrs' describe which serial port the attached equipment is connected to and the address of the attached equipment (in the case that multiple pieces of equipment are attached via the same serial port). Similarly, the 'EquipAttrMonConns' entry refer to configuration entries in the 'monitor.ini' file that describe the mechanism by which the attribute is recovered from the attached equipment and the 'EquipAttrMonConnPorts' and 'EquipAttrMonConnAddrs' describe the serial ports and addresses used for data recovery.

Hence the IC is in not actually aware of the semantics of the data values it is 'setting' or 'getting' and the mapping between the equipment and equipment attributes that the MC believes it is controlling is completely defined by the equipment controller configuration files and not equipment controller software.

The MC and IC communicate via the text format generally described above. All communication is initiated by the MC. Three request packets are currently defined: 1) a request to modify the attributes of a particular piece of equipment at a particular time in the future, 2) a request to cancel the request to modify the attributes of a particular piece of equipment, and 3) a request to return the current values of the attributes of a particular piece of equipment. Each request is normally responded to with a complementary message. In some cases, however, no response message purposely generated in order to communicate a negative response.

The request to modify the attributes of a particular piece of equipment is known as a Transmission Change Order (TCO). The format of a TCO is as follows:
   MessageSequenceNumber
   Equip=EquipmentClass:EquipmentUnitName
   Time=YYYYMMDDHHMM
   Attribute1=Value1
   Attribute2=Value2

When the IC receives a TCO it validates the request. The request validation includes confirming that the requested change time has not already past and that the IC configuration supports the requested modifications. The IC may refer to its memory resident database of configuration data to validate request. First, the IC may insure that the requested equipment is identified in the configuration. It then may insure, by tracing the attributes named in the request through the configuration to the commands that must be issued to insure that sufficient configuration information is present to form the required commands. Finally it may check to see if the equipment is currently responding to commands.

If an error is detected such that the request cannot be supported by the configuration, a response may be returned to the MC identifying the offending request data. For example, if a request contained an equipment identification that did not exactly match an entry in the 'equipct1.ini' file or if an attribute name did not exactly match one of the legitimate attributes named in the 'equipct1.ini' file, a response would be sent indicating why the TCO was invalid and implicitly indicating that the request would not be implemented. Further, if a legitimate attribute is named, but the equipment controller finds that either no serial command is referenced or that the referenced serial command is not configured, the IC may also send a similar response indicating why the request cannot be implemented. Validation of the parameter values may also be accomplished in a similar technique.

If the request is otherwise correct, but the equipment is currently not responding to serial commands, no response is purposely generated, which may indicate that no problem was detected in the request but that the since no acknowledgment was sent, the request will not be implemented at the specified time. Otherwise, an acknowledgment is returned to the MC indicating that unless otherwise instructed, the IC will perform the requested configuration change at the requested time. The request to cancel the modification of the attributes of a particular piece of equipment is known as a Abort Message (ABRT). The format of an ABRT is as follows:
ABRT
   MessageSequenceNumber
   Equip=EquipmentClass:EquipmentUnitName The IC may remove the outstanding command set to be issued to the specified equipment if any command is queued and may send an acknowledgment to the MC indicating it has done so. If, at the time of receipt, no command is outstanding, the IC may respond with a message indicating that no command was found. The request to recover the current values of the attributes of a particular piece of equipment is known as an Audit Message (AUDIT). The format of an AUDIT is as follows:
AUDIT
   MessageSequenceNumber
   Equip=EquipmentClass:EquipmentUnitName
   AttributeName (optional)
   AttributeName (optional)

The MC may request the current values of the equipment attributes by sending an AUDIT message to the IC. The message may contain specific attribute names or, in the absence of any attribute names, all attributes associated with the equipment are returned. Should the equipment or attributes identified not be defined in the IC configuration, the IC will send a message similar to the negative acknowledgment to a TCO indicating what particular field of the request message was found in error. If the AUDIT request message is found to be supported by the current IC configuration, the IC may will use the configuration entries identified by the 'equipct1.ini' file to recover the current values and will form a response message similar to the TCO message and send it to the MC. The response message format is as follows:
AUDIT
   MessageSequenceNumber
   Equip=EquipmentClass:EquipmentUnitName
   Time=YYYYMMDDHHMM
   Attribute1=Value1
   Attribute2=Value2

The Implementation component (IC) reads its configuration files at startup and constructs memory resident database tables and data 'objects' to facilitate rapid access to the configuration information stored in those files.

Among the data read from the configuration files are the records that describe the equipment that the Management Console (MC) application will attempt to control by its commands to the Equipment Controller. The MC will communicate with the Equipment Controller in message with a format similar to:

Equip=EquipmentClass:EquipmentUnitName
Attribute1=Value1
Attribute2=Value2 where 'EquipmentClass' and 'EquipmentName' are character string values that occur in the IC configuration files as identifying a piece of modeled equipment. The values of 'Attribute' and 'Value' are also represented as character strings and hence the entire dialog between the MC and IC is through text based messages.

The IC configuration files identify one or more pieces of modeled equipment and a set of attributes that the modeled equipment can support. For example, the following section of an 'equipct1.ini' file describes an equipment element known as 'TRANSMITTER:Outbound'. The modeled attributes are identified by the 'EquipModemAttrs' entry and list the values TXF TXR MODT MODR ENCT ENCR DENC SCR PWR CXR as the legitimate attributes of the unit known as 'TRANSMITTER:Outbound'.

[Outbound]
    EquipName=Outbound
    EquipClass=TRANSMITTER
    EquipModelAttrs=ALL TXF TXR MODT MODR ENCT ENCR DENC SCR PWR CXR
    EquipAttrSetCmds="" EFDataTxfSetCmd EFDataTxrSetCmd EFDataModtSetCmd
        EFDataModrSetCmd EFDataEnctSetCmd EFDataTxrSetCmd EFDataDencSetCmd
        EFDataScrSetCmd EFDataPwrSetCmd EFDataCarrierSetCmd
    EquipAttrSetCmdParms="TXF TXR ENCT PWR" "TXF" "ENCR TXR" "MODT" "MODR" "ENCT" "ENCR TXR" "DENC" "SCR" "PWR" "CYR"
    EquipAttrSetCmdPorts=Serial5
    EquipAttrSetCmdAddrs="1"
    EquipAttrMonConns="" EFDataTxfMon EFDataTxrMon EFDataModtMon
        EFDataModrMon EFDataEnctMon EFDataEncrMon EFDataDencMon
        EFDataScrMon EFDataPwrMon EFDataCarrierMon
    EquipAttrMonConnPorts=Serial5
    EquipAttrMonConnAddrs="1"
    AssociatedEquipment=RECEIVER:Demod1

This configuration entry also associates other configuration entries with the equipment attributes that permit the equipment controller to set (modify) and get (recover) the attribute values from an actual piece of serially attached equipment. The entries in the list of 'EquipAttrSetCmds' refer to entries in the 'serial.ini' file that describe the actual command to be sent. The entries in the 'EquipAttrSetCmdPorts' and 'EquipAttrSetCmdAddrs' describe which serial port the attached equipment is connected to and the address of the attached equipment (in the case that multiple pieces of equipment are attached via the same serial port). Similarly, the 'EquipAttrMonConns' entry refer to configuration entries in the 'monitor.ini' file that describe the mechanism by which the attribute is recovered from the attached equipment and the 'EquipAttrMonConnPorts' and 'EquipAttrMonConnAddrs' describe the serial ports and addresses used for data recovery.

Hence the IC is in not actually aware of the semantics of the data values it is 'setting' or 'getting' and the mapping between the equipment and equipment attributes that the MC believes it is controlling is completely defined by the equipment controller configuration files and not equipment controller software.

The MC and IC communicate via the text format generally described above. All communication is initiated by the MC. Three request packets are currently defined: 1) a request to modify the attributes of a particular piece of equipment at a particular time in the future, 2) a request to cancel the request to modify the attributes of a particular piece of equipment, and 3) a request to return the current values of the attributes of a particular piece of equipment. Each request is normally responded to with a complementary message. In some cases, however, no response message purposely generated in order to communicate a negative response.

The request to modify the attributes of a particular piece of equipment is known as a Transmission Change Order (TCO). The format of a TCO is as follows:

TCO
    MessageSequenceNumber
    Equip=EquipmentClass:EquipmentUnitName
    Time=YYYYMMDDHHMM
    Attribute1Value1
    Attribute2=Value2

When the IC receives a TCO it validates the request. The request validation includes confirming that the requested change time has not already past and that the IC configuration supports the requested modifications. The IC refers to its memory resident database of configuration data to validate request. First the IC insures that the requested equipment is identified in the configuration. It then insures, by tracing the attributes named in the request through the configuration to the commands that must be issued to insure that sufficient configuration information is present to form the required commands. Finally it checks to see if the equipment is currently responding to commands.

If an error is detected such that the request cannot be supported by the configuration, a response is returned to the MC identifying the offending request data. For example, if a request contained an equipment identification that did not exactly match an entry in the 'equipct1.ini' file or if an attribute name did not exactly match one of the legitimate attributes named in the 'equipct1.ini' file, a response would be sent indicating why the TCO was invalid and implicitly indicating that the request would not be implemented. Further, if a legitimate attribute is named, but the equipment controller finds that either no serial command is referenced or that the referenced serial command is not configured, the IC will also send a similar response indicating why the request cannot be implemented. Validation of the parameter values may also be accomplished in a similar technique.

If the request is otherwise correct, but the equipment is currently not responding to serial commands, no response is purposely generated, indicating that no problem was detected in the request but that the since no acknowledgment was sent, the request will not be implemented at the specified time.

Else an acknowledgment is returned to the MC indicating that unless otherwise instructed, the IC will perform the requested configuration change at the requested time.

The request to cancel the modification of the attributes of a particular piece of equipment is known as a Abort Message (ABRT). The format of an ABRT is as follows:
ABRT
  MessageSequenceNumber
  Equip=EquipmentClass:EquipmentUnitName
The IC will remove the outstanding command set to be issued to the specified equipment if any command is queued and will send an acknowledgment to the MC indicating it has done so. If, at the time of receipt, no command is outstanding, the IC will respond with a message indicating that no command was found.

Figure 13:
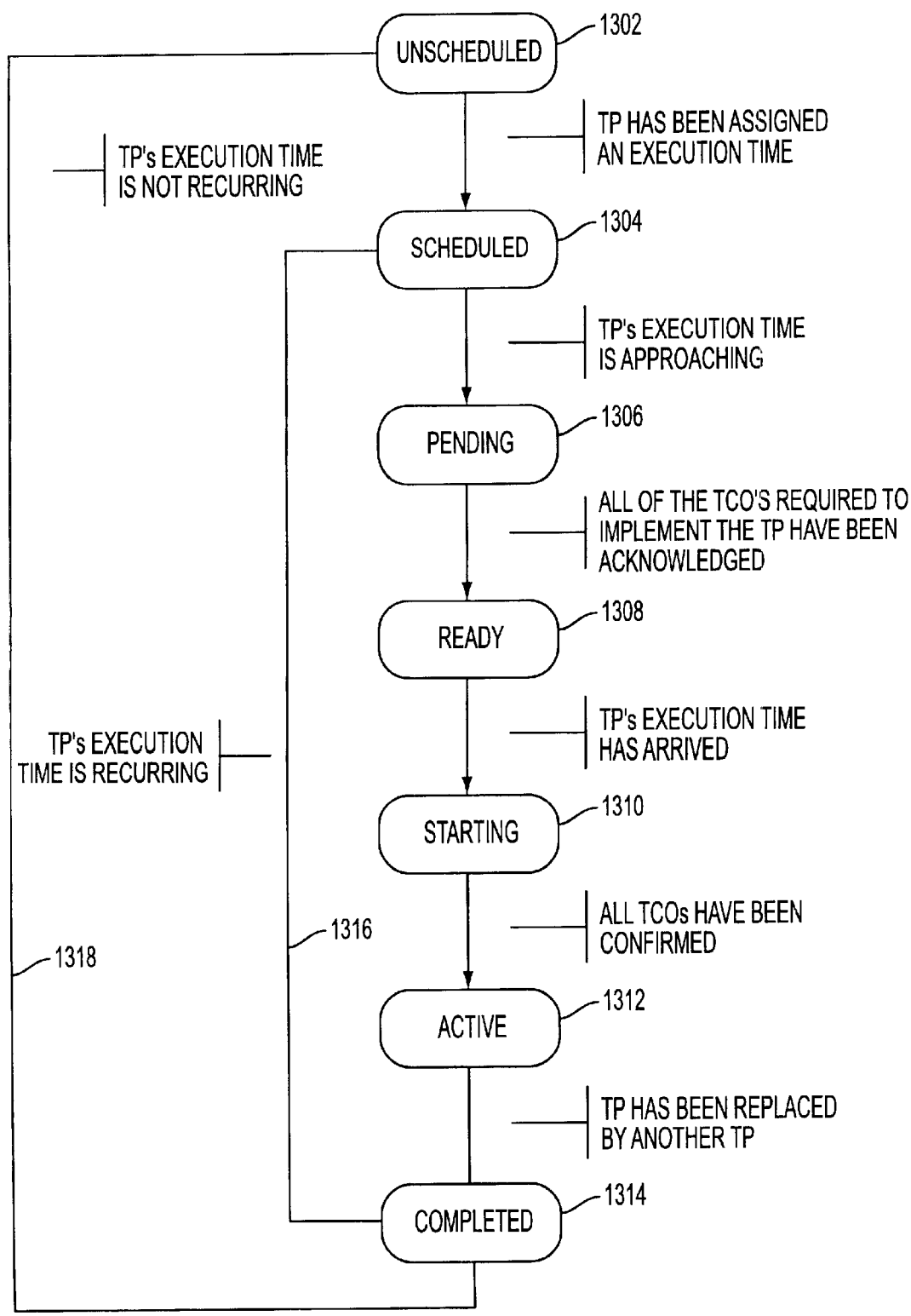
FIG. 13 is a flowchart illustrating a method of transmission plan deployment and execution.

FIG. 13 depicts a flow chart of a transmission plan execution. Initially, the system may have an unscheduled transmission (1302). The transmission plan may be assigned an execution time (1304). The transmission plan may be propagated to the network to place the plan onto a pending status (1306). After all of the TCO's required to implement the transmission plan have acknowledged the command, the transmission plan is ready for execution (1308). At the transmission plan execution time (1310) the plan began the start sequence. After the MC confirms that all TCO's have been confirmed, e.g., so that the MC does not issue an abort command, the transmission plan goes active (1312).

The system then begins normal operation on the new transmission plan and the system begins collecting data again on link usage (1316). Special transmission plans, e.g., transmission plans that are not recurring, are not re-scheduled (1318).

Figure 14:
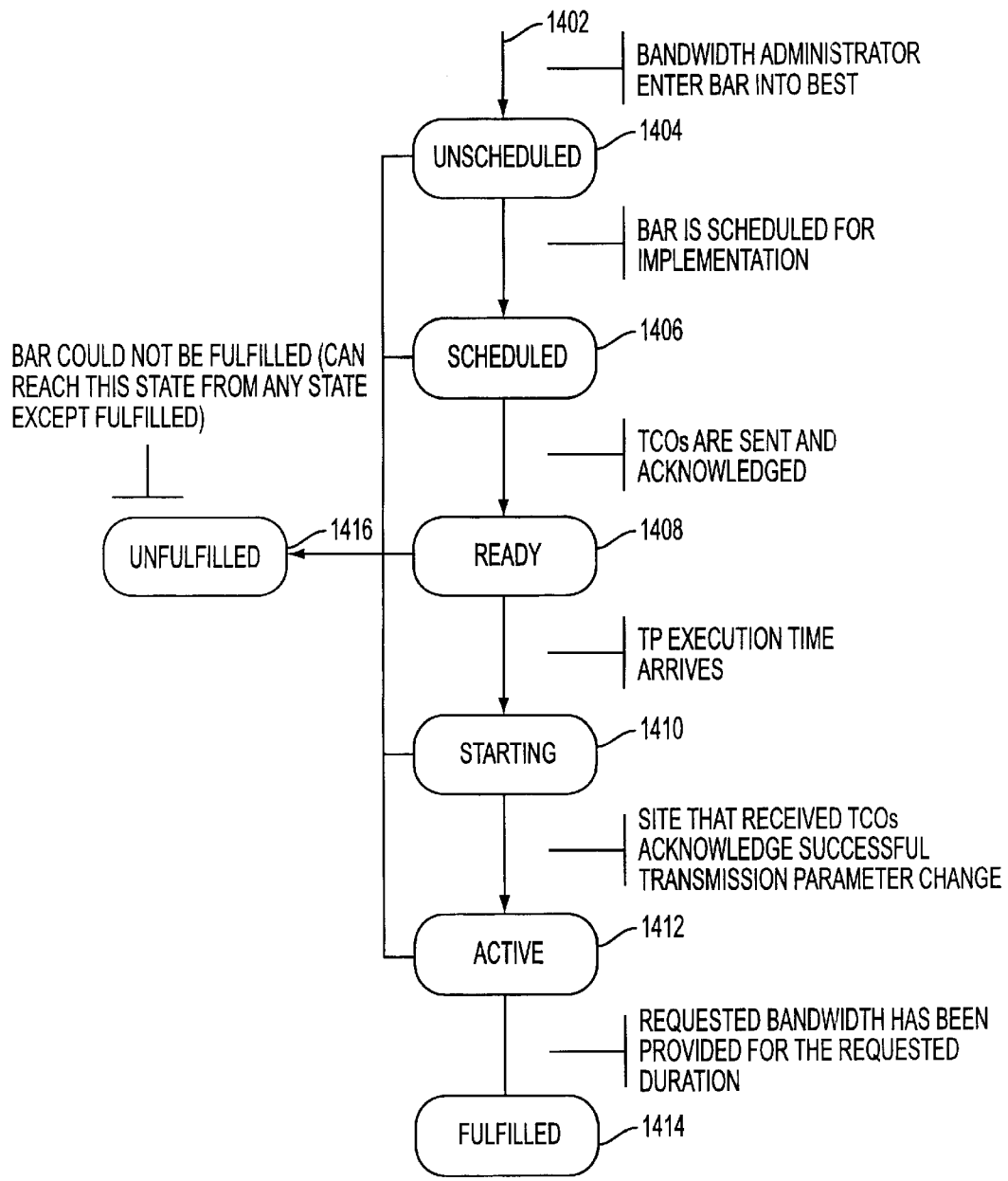
FIG. 14 is a flowchart illustrating a method of executing a bandwidth allocation request.

FIG. 14 depicts a bandwidth allocation request. This control loop may execute at the MC. The system may receive a request for bandwidth 1402 from the Bandwidth administrator or an IC. The request may be an unscheduled network event 1404. The request for bandwidth is decoded and scheduled for execution 1406. The execution schedule may be for immediate execution or for a scheduled deployment. The appropriate TCO may be sent from the MC to the appropriate IC to propagate the transmission plan and to put the plan into the ready state 1408. The transmission plan then waits for its execution time. When the transmission plan execution time arrives (1410) the MC confirms that the TCO's were confirmed by the ICs. If the TCO's were confirmed, the plan goes active (1412) at the predetermined time the system has thereby fulfilled (1414) the bandwidth request.

The IC may implement a control loop similar to that shown and described above. The IC may confirm that a channel is available within the present transmission plan 1406 and immediately execute the new transmission pan 1408, 1410 and 1412. The IC may then notify the MC 1402 of the unscheduled 1404 transmission plan. The MC may then proceed as described above to propagate and deploy the new plan.

FIG. 5 depicts the inter-process communication between the MC 502 and ICs (506) and 542. MC commands are sent via the UDP/IP link 504 from the control component 503 to the equipment control component 514. The equipment controller 514 then maps the generic network commands from the MC to specific commands (discussed above) for output (512) to the managed equipment (510). The equipment controller (514) may lose the command event (524). The IC may also denote the command event on the local display 530.

The system may receive alarm and other network messages that may effect the network management display 518 via the TCP/IP connection 516. Equipment controller 514 may connect to the display controller 518 when the equipment controller 514 receives an alarm condition from the network equipment (510,520) via command links (512, 522). The event logger (534) may receive network audits and network events from the IC 506 equipment controller (514) via UDP/IP link 532. As provided above, each of the communication processes on FIG. 5 may be interpret or poll driven.

The IC may also denote the command event on the local display 530.

The system may receive alarm and other network messages that may effect the network management display 518 via the TCP/IP connection (516). Equipment controller (514) may connect to the display controller (518) when the equipment controller 514 receives an alarm condition from the network equipment (510,520) via command links (512, 522). The event logger (534) may receive network audits and network events from the IC 506 equipment controller (514) via UDP/IP link (532). As provided above, each of the communication processes on FIG. 5 may be interrupt or poll driven.

Other embodiments and uses of the invention will be apparent to those skilled in the art from consideration of the specification and practice of the invention disclosed herein. The specification and examples should be considered exemplary only. The scope of the invention is only limited by the claims appended hereto.

Therefore we claim:

1. A method for facilitating network management in a multiple vender communications network comprising the steps of:
  recieve a generic network command from a management component on the network at an implementation component that controls one or more specific communication devices in the multiple vender communications network, the generic network command comprising one or more model parameters and hardware identification information;
  translating the generic network command to one or more specific commands for a particular device through one or more configuration files stored at the implementation component by using the hardware identification information and one or more model parameters as indexes to the configuration file settings; and
  outputting said translated one or more specific commands for a particular device to said particular network device.

2. The method of claim 1 further comprising the step of:
  modifying the performance of the particular network device according to the one or more translated specific command.

3. The method of claim 1 wherein the model parameters comprise parameter-value pairs.

4. The method of claim 3 wherein the values specified for a parameter comprise one or more value text strings.

5. The method of claim 4 wherein the one or more configuration files stored by the implementation component contain entries for the value text strings that correspond to specific commands for a particular device controlled through the implementation component.

6. The method of claim 5 wherein the configuration file is a text-based file and wherein the value text strings comprise entries used to retrieve the text-based specific commands for a particular device.

7. The method of claim 6 wherein the text-based specific commands are passed to the particular device to implement a command contained in the generic network command.

8. The method of claim 1 wherein the generic network command further comprises an implementation time and further comprising the step of modifying the performance of the device identified in the hardware identification information at the implementation time using the one or more specific commands for that particular device.

9. The method of claim 8 wherein the hardware identification information identifies a transmitter and wherein one or more specific commands comprise changes to the manner in which that transmitter transmits information.

10. The method of claim 9 wherein the specific commands change the transmission plan on the multiple vendor network and wherein the manner in which the transmitter transmits information is changed according to the transmission plan.

11. The method of claim 1 further comprising the step of sending the management component an acknowledgement of the command.

12. The method of claim 1 further comprising the step of validating the model parameters to the configuration file for the identified hardware prior to translating the model parameters into specific device commands.

13. The method of claim 12 further comprising the step of sending the management component an acknowledgement that the command was acted upon.

14. The method of claim 13 wherein the acknowledgement comprises model parameters that were not validated.

15. The method of claim 1 further comprising the step of auditing communications devices in the network through the implementation components that mange those devices.

16. The method of claim 15 wherein the audit indicates to the management component any modifications to the devices that occurred without the management component being notified.

17. The method of claim 1 further comprising the step of creating database tables and data objects from the configuration file at the implementation component to facilitate translation of model parameters to device specific commands.

18. The method of claim 1 wherein the generic network command comprises a datagram communicated to the implementation component using user datagram protocol over an internet protocol.

19. The method of claim 1 wherein the generic network command comprises an ASCII character message.

20. The method of claim 1 wherein the generic network command comprises a plurality of fields.

21. The method of claim 20 wherein the fields comprise header fields and information fields.

22. The method of claim 21 wherein the header fields comprise a message type field, a sequence number field, and a hardware identification field.

23. The method of claim 21 wherein the information fields comprise the model parameters.

24. An implementation component for controlling one or more communication devices in a multiple vender communication network comprising:
  receiving means for receiving a generic network command from a management component on the network, the generic network command comprising one or more model parameters and hardware identification information;
  storage means for storing one or more configuration files comprising model parameters, hardware identification information and specific component commands for one or more particular communication devices;
  translation means for translating the generic network command to one or more specific commands for a particular vendor device through one or more configuration files by using the hardware identification information and one or more model parameters as indexes to the configuration file settings; and
  command output means for outputting said translated one or more specific commands for a particular device to said particular network device.

25. The system of claim 24 wherein the model parameters comprise parameter-value pairs of text strings and wherein the one or more configuration files contain entries for the value text strings that correspond to specific commands for a particular device controlled through the implementation component.

26. The system of claim 24 wherein the generic network command further comprises an implementation time and wherein the specific command indicates the implementation time at which the particular device is to modify its performance based on the specific command.

27. The system of claim 26 wherein the hardware identification information identifies a transmitter and wherein the one or more specific commands comprise changes to the manner in which that transmitter transmits information.

28. The system of claim 27 wherein the one or more specific commands change the transmission plan on the multiple vendor network and wherein the manner in which the transmitter transmits information is changed according to the transmission plan.

29. The system of claim 24 further comprising acknowledgement transmission means for sending the management component an acknowledgement of the command.

30. The system of claim 24 further comprising model parameters validation means for validating the model parameters with the configuration file for the identified hardware prior to translating the model parameters into specific device commands and wherein the acknowledgement means includes model parameters that were not validated in the acknowledgement sent to the management component.

31. A management component that communicates with an implementation component for controlling one or more communication devices in a multiple vender communication network, the management component comprising:
  generic network command formulation means for formulating a generic network command comprising one or more model parameters and hardware identification information, wherein the model parameters comprise text-based codes relating to performance attributes for a communication device controlled by an implementation component, the text-based codes being usable by the implementation component with a configuration file to convert those codes into device-specific commands to alter the performance of the device; and
  generic message transmission means for transmitting the generic network command to one or more implementation components in the network.

32. The system of claim 31 wherein the generic network command further comprises an implementation time and wherein the specific command indicates the implementation time at which the particular device is to modify its performance based on the specific command.

33. A multiple vendor system comprising:
  a management component comprising:
    generic network command formulation means for formulating a generic network command comprising one or more model parameters and hardware identification information, wherein the model parameters comprise text-based codes relating to performance attributes for a communication device controlled by an implementation component, the text-based codes being usable by the implementation component with a configuration file to convert those codes into device-specific commands to alter the performance of the device; and generic message transmission means for transmitting the generic network command to one or more implementation components in the network; and one or more implementation components comprising:

receiving means for receiving a generic network command from a management component on the network, the generic network command comprising one or more model parameters and hardware identification information;

storage means for storing one or more configuration files comprising model parameters, hardware identification information and specific component commands for one or more particular communication devices;

translation means for translating the generic network command to one or more specific commands for a particular vendor device through one or more configuration files by using the hardware identification information and one or more model parameters as indexes to the configuration file settings; and command output means for outputting said translated one or more specific commands for a particular device to said particular network device.

34. The system of claim 33 wherein the model parameters comprise parameter-value pairs of text strings and wherein the one or more configuration files stored by the implementation component contain entries for the value text strings that correspond to specific commands for a particular device controlled through the implementation component.

35. The system of claim 33 wherein the generic network command further comprises an implementation time and wherein the specific command indicates the implementation time at which the particular device is to modify its performance based on the specific command.

36. The system of claim 33 wherein the hardware identification information identifies a transmitter and wherein one or more specific commands comprise changes to the manner in which that transmitter transmits information.

37. The system of claim 33 wherein the specific commands change the transmission plan on the multiple vendor network and wherein the manner in which the transmitter transmits information is changed according to the transmission plan.

38. The system of claim 33 further comprising acknowledgement transmission means for sending the management component an acknowledgement of the command.

39. The system of claim 33 further comprising model parameter validation means for validating the model parameters with the configuration file for the identified hardware prior to translating the model parameters into specific device commands and wherein the acknowledgement means includes model parameters that were not validated in its acknowledgement to the management component.

40. A method for controlling one or more communication devices in a multiple vender communication network comprising:

formulating a generic network command comprising one or more model parameters and hardware identification information, wherein the model parameters comprise text-based codes relating to performance attributes for a communication device controlled by an implementation component, the text-based codes being usable by the implementation component with a configuration file to convert those codes into device-specific commands to alter the performance of the device; and transmitting the generic network command to one or more implementation components in the network that converts the generic network command into a device specific command to modify the performance of a communication device in the network.

41. The method of claim 40 wherein the generic network command further comprises an implementation time and wherein the specific command indicates the implementation time at which the particular device is to modify its performance based on the specific command.

* * * * *